United States Patent
King

(10) Patent No.: US 9,122,911 B2
(45) Date of Patent: *Sep. 1, 2015

(54) SYSTEM, METHOD AND COMPUTER PROGRAM FOR VERIFYING A SIGNATORY OF A DOCUMENT

(71) Applicant: PAYCASSO VERIFY LTD., London (GB)

(72) Inventor: Russell King, London (GB)

(73) Assignee: PAYCASSO VERIFY LTD., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,318

(22) Filed: Dec. 5, 2014

(65) Prior Publication Data

US 2015/0086088 A1 Mar. 26, 2015

Related U.S. Application Data

(63) Continuation-in-part of application No. 14/229,787, filed on Mar. 28, 2014, now Pat. No. 8,908,977.

(30) Foreign Application Priority Data

Mar. 28, 2013 (GB) .................................. 1305814.4
Nov. 1, 2013 (GB) .................................. 1319344.6

(51) Int. Cl.
*G06K 9/00* (2006.01)
*G06K 9/03* (2006.01)
(Continued)

(52) U.S. Cl.
CPC ............ *G06K 9/00221* (2013.01); *B42D 25/00* (2014.10); *G06K 9/00906* (2013.01); *G06K 9/036* (2013.01); *B42D 25/305* (2014.10)

(58) Field of Classification Search
CPC .......... G06K 9/00221; G06K 9/00248; G06K 9/00268; G06K 9/00275; G06K 9/00295; G06K 9/00302; G06K 9/00308; G06K 9/00315; G06K 2009/00328; G06K 9/00617
See application file for complete search history.

(56) References Cited

U.S. PATENT DOCUMENTS

| 8,752,145 B1 | 6/2014 | Dotan |
| 2002/0097145 A1* | 7/2002 | Tumey et al. ................. 340/426 |

(Continued)

FOREIGN PATENT DOCUMENTS

| CN | 101162500 A | 4/2008 |
| CN | 102129555 A | 7/2011 |

(Continued)

OTHER PUBLICATIONS

"A confidence-based update rule for self-updating human face recognition systems." Pavani, Sri-Kaushik et al.

(Continued)

*Primary Examiner* — Brian Le
(74) *Attorney, Agent, or Firm* — EIP US LLP

(57) ABSTRACT

Systems and method for verifying a user signing a document are disclosed. In particular, certain disclosed embodiments relate to verifying that a user signing a document corresponds to a previously authenticated user, the user having been previously authenticated using a source of machine-readable identity data. The verifying may be made by receiving, from the source of machine-readable identity data, first digital image data indicative of a first image of the previously authenticated user and first identity data, and receiving from a camera, a captured second image comprising second digital image data that corresponds to the user. Responsive to the first image and the second image being determined to represent the same user, verification data is generated and associated with the document.

17 Claims, 5 Drawing Sheets

(51) Int. Cl.
*B42D 25/00* (2014.01)
*B42D 25/305* (2014.01)

(56) References Cited

U.S. PATENT DOCUMENTS

| | | |
|---|---|---|
| 2002/0158750 A1 | 10/2002 | Almalik |
| 2004/0258280 A1 | 12/2004 | Merry et al. |
| 2005/0226467 A1 | 10/2005 | Hatano et al. |
| 2006/0120575 A1 | 6/2006 | Ahn et al. |
| 2006/0147093 A1 | 7/2006 | Sanse et al. |
| 2006/0231610 A1 | 10/2006 | Cheng |
| 2007/0065045 A1 | 3/2007 | Iwasaki |
| 2008/0302870 A1 | 12/2008 | Berini et al. |
| 2009/0091650 A1 | 4/2009 | Kodama |
| 2009/0185241 A1 | 7/2009 | Nepomniachtchi |
| 2009/0185723 A1 | 7/2009 | Kurtz et al. |
| 2010/0008535 A1 | 1/2010 | Abulafia et al. |
| 2010/0299530 A1 | 11/2010 | Bell |
| 2011/0150362 A1 | 6/2011 | Mitra |
| 2011/0299741 A1 | 12/2011 | Zhang et al. |
| 2012/0114190 A1 | 5/2012 | Bladel |
| 2012/0140993 A1 | 6/2012 | Bruso et al. |
| 2013/0077833 A1 | 3/2013 | Kritt |

FOREIGN PATENT DOCUMENTS

| | | |
|---|---|---|
| CN | 102456130 A | 5/2012 |
| EP | 2140401 A2 | 1/2010 |
| EP | 2546782 A1 | 1/2013 |
| GB | 2373124 A | 9/2002 |
| GB | 2500823 A | 10/2013 |
| JP | 2012068924 A | 4/2012 |
| KR | 20040048753 A | 6/2004 |
| WO | 2012079996 A1 | 6/2012 |
| WO | 2013153118 A1 | 10/2013 |

OTHER PUBLICATIONS

"Evaluating liveness by face images and the structure tensor." Kollreider at al.

"Liveness detection for embedded face recognition system." Jee, Hyun-Keun et al.

International Search Report and Written Opinion issued Nov. 12, 2014 on related PCT application PCT/GB2014/050993, filed Mar. 28, 2014.

* cited by examiner

US 9,122,911 B2

SYSTEM, METHOD AND COMPUTER PROGRAM FOR VERIFYING A SIGNATORY OF A DOCUMENT

CROSS-REFERENCE TO RELATED APPLICATIONS

This application is a continuation in part of U.S. patent application Ser. No. 14/229,787 filed Mar. 28, 2014, which claims priority under 35 U.S.C. §119(a) to (1) GB Application No. GB1305814.4, filed Mar. 28, 2013; and (2) GB Application No. GB1319344.6, filed Nov. 1, 2013. The entire contents of the above-referenced patent applications are hereby incorporated by reference.

BACKGROUND OF THE INVENTION

1. Field of the Invention

The present application relates to a method, system and computer program for verifying a user signing a document.

2. Description of the Related Technology

Recent developments in law have allowed so called "electronic signatures" or "e-signatures" to have legal effect. An e-signature can be used in place of a physical signature. For example, a person may give an e-signature by typing their name between "/" characters, such as "/John Smith/". So called "digital signatures" are also known; a digital signature is tied to a digital certificate. The digital certificate is unique and is used in a cryptographic process to verify that at the time of signing the person was in possession of the digital certificate. Entry of a password to access the digital certificate may be required before the digital signature is generated. Neither electronic signatures nor digital signatures can verify that the person giving a signature is the person who they claim to be.

SUMMARY

In accordance with embodiments of the present disclosure, there is provided a method and apparatus and computer software for use in verifying that a user signing a document corresponds to a previously authenticated user.

In one embodiment, a method of verifying that a user signing a document corresponds to a previously authenticated user, the previously authenticated user having been previously authenticated using a source of machine-readable identity data, is provided. The method comprises:

receiving, from the source of machine-readable identity data, first digital image data indicative of a first image of the previously authenticated user;

receiving, from the source of machine-readable identity data, first identity data associated with the first digital image data, the first identity data being associated with the previously authenticated user;

receiving, from a camera, a captured second image comprising second digital image data, wherein the second image corresponds to the user;

comparing the first digital image data to the second digital image data;

determining, based on the comparing of the first digital image data to the second digital image data, that the first image and the second image represent the same user;

responsive to the first image and the second image being determined to represent the same user, generating verification data indicating that the user is the previously authenticated user, the verification data including second identity data indicative of the previously authenticated user; and associating the verification data with the document.

In another embodiment, a system for verifying that a user signing a document corresponds to a previously authenticated user, the previously authenticated user having been previously authenticated using a source of machine-readable identity data, is provided. The system comprises:

a processor;

a memory in data communication with the processor;

computer instructions stored in the memory, which, when executed by the processor, are configured to cause the system to:

receive, from the source of machine-readable identity data, first digital image data indicative of a first image of the previously authenticated user;

receive, from the source of machine-readable identity data, first identity data associated with the first digital image data, the first identity data being associated with the previously authenticated user;

receive, from a camera, a captured second image comprising second digital image data, wherein the second image corresponds to the user;

compare the first digital image data to the second digital image data;

determine, based on the comparison of the first digital image data to the second digital image data, that the first image and the second image represent the same user;

responsive to the first image and the second image being determined to represent the same user, generate verification data indicating that the user is the previously authenticated user, the verification data including second identity data indicative of the previously authenticated user; and associate the verification data with the document

DETAILED DESCRIPTION OF CERTAIN INVENTIVE EMBODIMENTS

A conventional way of verifying the identity and/or credentials of a person is to ask that person to provide documentation that supports their identity and/or credentials. For example, a person may be asked to provide a valid photographic ID, such as a passport or driving license as proof of their identity. In this case, in order to verify that person's identity, typically two separate checks are performed. Firstly, the validity of the photographic ID is checked and secondly the person providing the photographic ID is compared to the image on the photographic ID in order to verify that the photographic ID belongs to that person. Typically, these checks are performed by a human.

There are known techniques for checking the validity of an identity document, such as a photographic ID, via a device. For example, by configuring a device to look for certain features in an image, it is possible to verify, up to a reasonable level of certainty, via a device, whether an image of an identity document is an image of a valid identity document. Such features may include, for example, the inclusion of certain check digits within machine readable zones on the identity document (which can be read by a device using optical character recognition (OCR) techniques), or the inclusion of an image of a human face that is located in an expected position relative to other features of the document. Other validity indicators include, for example, the inclusion of water marks or holograms, and the use of particular fonts.

Figure 1:
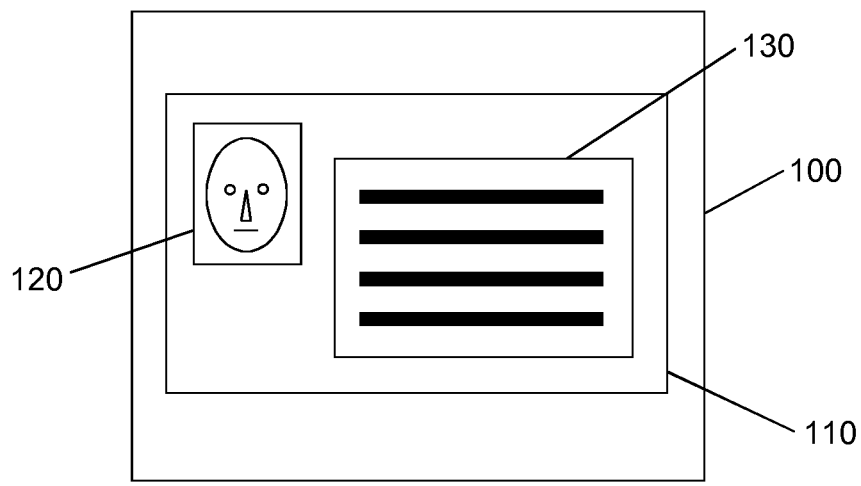
FIG. 1 illustrates schematically an exemplary first captured image according to an arrangement of the present application.
Figure 2:
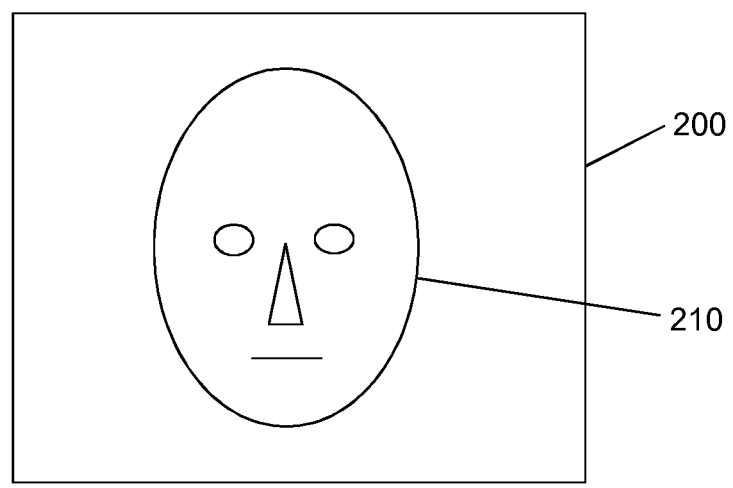
FIG. 2 illustrates schematically an exemplary second captured image according to an arrangement of the present application.

It has been recognized by the present inventors that, if it were possible to perform the second check via a device, namely the comparison of the face of a user of a device to the picture of a human face on a photographic ID held by the user of the device, then it would also be possible to authenticate the user of the device in this way. It has been realized by the present inventors that this could be achieved by configuring a device to capture an image of the user of the device, and an image of an identity document held by the user of the device, and to compare the image of the user of the device to the picture of the human face on the identity document to determine whether they represent the same entity. FIGS. 1 and 2 show examples of two such captured images 100, 200.

As an alternative, or in addition, to authenticating a user of a device, such a comparison can also be used in other situations where confirmation of identity are important. One such situation is the signature of documents when it is required to verify the identity of a signatory. In a first such embodiment, a method of verifying that a user signing a document corresponds to a previously authenticated user involves using a source of machine-readable identity data. More particularly, the method comprises receiving, from the source of machine-readable identity data, first digital image data indicative of a first image of the previously authenticated user; receiving, from the source of machine-readable identity data, first identity data associated with the first digital image data, the first identity data being associated with the previously authenticated user; receiving, from a camera, a captured second image comprising second digital image data, wherein the second image corresponds to the user; comparing the first digital image data to the second digital image data; determining, based on the comparing of the first digital image data to the second digital image data, that the first image and the second image represent the same user; responsive to the first image and the second image being determined to represent the same user, generating verification data indicating that the user is the previously authenticated user, the verification data including second identity data indicative of the previously authenticated user; and associating the verification data with the document.

Such a method can provide more certainty of the identity of a signatory of a document.

The document may be any document which is required to be signed, for example, a digital document and/or a paper document. When the document is a digital document it may be an electronic document or a document in digital/electronic form. Examples include but are not limited to word processing documents, portable document format (PDF) documents and xml documents. The digital document may encoded in character format or in image format. The digital document may be stored locally or remotely, in storage accessible over the internet or other network. The paper document may be associated with a unique document ID number which is input to begin the verified signing process. In other embodiments the paper document may include machine-readable data that can be read by a device to begin the signing process, for example a bar code which is read or otherwise scanned by a document signing application running on a device.

The reference to "receiving" is used in a broad sense to include passive receipt in response to a transmission from another entity, or active receipt by obtaining data in response to a request. The source of machine-readable identity data may be, for example, an identification document which allows the digital image data to be obtained from the identification document itself. In other embodiments the source of machine-readable identity data may be a remote server which stores the digital image data and transmits it for receipt.

The camera may be a standalone camera or integrated into another device, for example a computer or mobile device. In some embodiments, the method may be implemented by a device which has the camera integrated with the device.

The first identity data can be a plain text name or another representation that can be used for identification, such as a card number or document ID, including a passport or driver's license number. The second identity data may be the same as the first identity data, for example when the first data is a plain text name. The second identity data could also be different, for example representing the name in plain text when the first identity data is a card number or document ID.

The verification data may take various forms, for example it may be a digitally signed statement confirming that the person corresponding to the second identity data has been verified. Such a digitally signed statement may be signed by a trusted third party, such as an identity verification provider. This verification data may be associated with the signing of the document. The verification data may include the second digital image data which was captured by the camera. The verification data may also include or be otherwise associated with non-repudiation data, thereby allowing a verification that the document has not been modified since the verification data was associated. Examples of non-repudiation data include a checksum or hash function calculated from the document at the time the verification data was associated.

The verification data may be associated with the document in various ways. In one embodiment the verification data may be encoded in document metadata and displayed when the document is viewed. Alternatively or in addition, the verification data may be associated with the document in a position within the document where the signature was indicated, for example by embedding it in line within the document. The verification data may also be stored separately from the document and associated with the document in any suitable way, such as through a unique identifier of the document. The verification data may be in addition to an electronic or digital signature made by the user.

In some embodiments, the method may further comprise: deriving, based the document, third identity data indicative of an intended signatory of the document; and determining, using the first identity data and the third identity data, that the intended signatory corresponds to the previously authenticated user; wherein the generating verification data is responsive to both the determining that the signatory corresponds to the previously authenticated user and the determining that the first digital image and the second digital image represent the same user.

Such a method provides a further level of certainty over the identity of a signatory by determining that the identity data from the source of machine-readable identity data matches the name of an intended signatory in the document. The third identity data may take several forms, for example it may be an identifier of the previously authenticated user (such as a passport number or driver's license number) or the name of the previously authenticated user. When the third identity data is the name of the previously authenticated user, the level to which the name of the signatory is determined to correspond to the name associated with the previous authenticated user may vary. For example, a correspondence could be determined when there is an identical surname and identical initials, or when there is an identical surname and an identical first name. In other words the name of the signatory and the name of the previous authenticated user may not be exactly the same but could still correspond. In other examples, alternative spellings and abbreviations may be determined to correspond. For example "Thomas" may correspond to "Tom" and "Junior" may correspond to "Jr.". The degree of correspondence required may be dependent on the level of certainty required for the verification.

The third identity data may be derived by parsing text data of the document. The parsing can take various forms and in general covers any method of extracting data from a document. For example, the signatory names or identifiers may be encoded within an xml schema of a digital document. In other embodiments the signatory names may be identified by parsing the document to identify a context within the document in which signatories are indicated, this may be carried out on an image of a document which has been processed using optical character recognition or directly on a character-coded digital document. In further embodiments the intended signatory names may be obtained from a separate source and retrieved with a query using data derived from the document, such as an identifier associated with the document or a hash of some or all of the document data.

When the source of machine-readable identity data is an identity document, the identity document having previously authenticated the previously authenticated user; the method further may comprise: capturing, using a camera, an image of the identity document, thereby to obtain at least one of the first digital image data and the first identity data.

In some embodiments, when the capturing an image of the identity document is to obtain the first digital image data, the method may further comprise: accessing, by a chip reader, an integrated circuit component of the identity document, thereby to obtain third digital image data indicative of a third digital image of the previously authenticated user; comparing the second digital image data to the third digital image data; and determining, based on the comparing of the second digital image data to the third digital image data, that the second digital image and the third digital image represent the same user.

In further embodiments, the method may further comprise: accessing, by a chip reader, an integrated circuit component of the identity document thereby to obtain the first digital image data and the first identity data.

In further embodiments, where the source of machine-readable identity data is an identity document, the method may further comprise: reading security data from the identity document; and determining that the identity document is genuine based at least in part on the security data. The generating of verification data is then responsive to both the determining that the identity document is genuine and the determining that the first digital image and the second digital image represent the same user.

This may provide improved security. For example, an identity document may have a machine-readable security feature such as a barcode (including 1D or 2D barcode) or a magnetic strip that provides the security data. The security feature can then be used to authenticate the identity document as genuine. For example, the security feature may encode data reproduced elsewhere on the identity document in plaintext or encrypted form, or may encode data based on that data to enable tampering of the document to be detected more easily. A document may be determined as genuine in any suitable way based on the security data, for example by ensuring that the security data matches data obtained or derived from another portion of the identity document. Examples of such security features include a machine-readable integrated circuit or chip and such a 2D barcode. For example a 2D barcode on a Driver's License may encode license data which is also machine-readable from other areas of the Driver's License. The data included in the 2D barcode and which forms security data varies by state but may include License ID, State, Birth Date, Name, Issue Date, Expiration Date, Address (including City, street address and ZIP), Sex, Eye color, Hair color, Height and weight. In some embodiments the data in the 2D Barcode may be encoded as a PDF417 Barcode according to ISO15438 with characteristics as defined in the 2013 American Association of Motor Vehicle Manufacturers (AAMVA) DL/ID Card Design Standard, incorporated herein by reference for all purposes.

The associating the verification data with the document may be responsive to receipt of input data indicative of an intent of the user to sign the document in some embodiments. The input data indicative of an intent to sign may take various forms including written form and spoken form. Non-limiting examples of the input data include: an electronic signature, a digital signature, a handwritten signature digitized in some form (such as by a digitizing graphics tablet or touch screen), a presence of the user which allowed the second digital image data to be captured, and a verbal confirmation.

In some embodiments the input data is stored and associated with the document. This association could be made in several ways, for example in metadata or by embedding the input data at an appropriate point in a digital document. The input data could also be stored remotely from the document, for example in a remote server, and linked to the document.

Referring again to the drawings, the first image 100, as illustrated schematically in FIG. 1, is an image of an identity document 110, which is associated with a person. The identity document 110 contains a picture 120 of the person associated with the identity document 110. Typically, an identity document 110 will include details 130 which can be used to identify the identity and/or other credentials of the person associated with the identity document 110. Some identity documents 110 may also comprise a chip, which stores additional information about the person associated with the identity document 110 and can be interrogated by a chip reader via a suitable protocol. The chip may store, for example, biometric information, such as a digital image of the person associated with the identity document 110 and/or other identifying information about the person, e.g. name, address, etc., together with data relating to the authority that issued the identity document 110.

Identity documents are typically issued by a trusted authority, such as the Government, for example. Such a trusted authority will have previously verified that the picture 120 is a picture of the person associated with the identity document 110 and will have authenticated that person as the person associated with the details 130. The identity document may be a physical document, such as an identity card, passport or certificate, or it may be an electronic document, such as a digital photograph and associated identity data.

The second image 200, as illustrated schematically in FIG. 2, is an image of the user 210 of a device, which has been captured e.g. by a camera on the device. By comparing the first and second images 100, 200, it is possible to verify whether the user 210 of the device, at the time that the second image 200 was captured, is the person associated with the identity document 110.

Many facial recognition and matching technologies exist in the art. In order to reliably perform the required matching, most such technologies require facial images to be of a high quality such that they contain sufficient distinctive detail to determine whether they represent the same person. Factors that typically affect the reliability of facial matching between two images include the resolution of the images (which can be usefully quantified as the number of pixels between the eyes of the person) and the illumination of the person's face. Images with too much illumination appear washed out, such that only very strong facial features, such as the eyes and nose stand out, and images with too little illumination have only very limited contrast and thus the mentioned strong facial features are less visible.

Pictures 120 on identity documents 110 are typically of a low quality. For example, they are typically small, over-exposed and have a low resolution. Furthermore, many identity documents 110 have visible security features printed over the picture 120, which can obscure facial details in the picture 120, making facial matching difficult. If the identity document 110 is subsequently imaged, the quality of the face in question is yet reduced.

Current facial matching technologies do not perform well enough to reliably perform a comparison between the very low-quality captured picture 120 in an image 100 of an identity document 110 and an image 200 of a user 210 of a device, which has been captured by the device. Embodiments of the present disclosure are, therefore, concerned with providing an image matching method that can reliably compare a low-quality image with another image so as to determine whether they represent the same entity.

Figure 3:
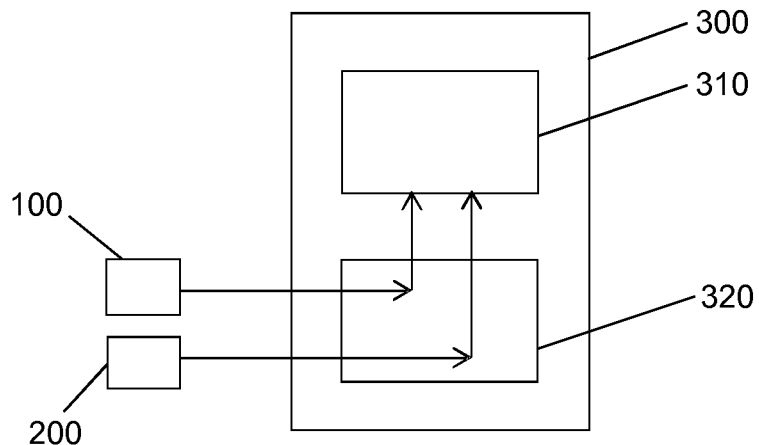
FIG. 3 illustrates schematically an exemplary device configured to carry out a method according to an arrangement of the present application.

FIG. 3 shows a block diagram of a device 300 arranged to carry out a comparison according to an exemplary arrangement. The device 300 may be, for example, a mobile phone, a computer or a tablet. The device 300, in this example, comprises a processing system 310 and an image capture component 320, such as a camera. The image capture component 310 may be integral with the device 300, or it may be separate from, but communicable with the device 300.

In the present arrangement, the device 300 is configured to capture both a first image 100 of an identity document 110 associated with a previously authenticated user, and a second image 200 of a user 210 of the device 300. These images 100, 200 are provided to the processing system 310 as illustrated schematically by the arrows in FIG. 3. In an alternative arrangement, the processing system 310 may be remote from the device 300, in which case, the device 300 may send the first and second images 100, 200 to the processing system 310 via a wired or wireless network for example. This arrangement is discussed in more detail below, with reference to FIG. 7.

In yet another arrangement, the first image 100 may have previously been captured and stored in a storage device, and the processing system 310 may be arranged to retrieve the first image 100 from the storage device.

Figure 4:
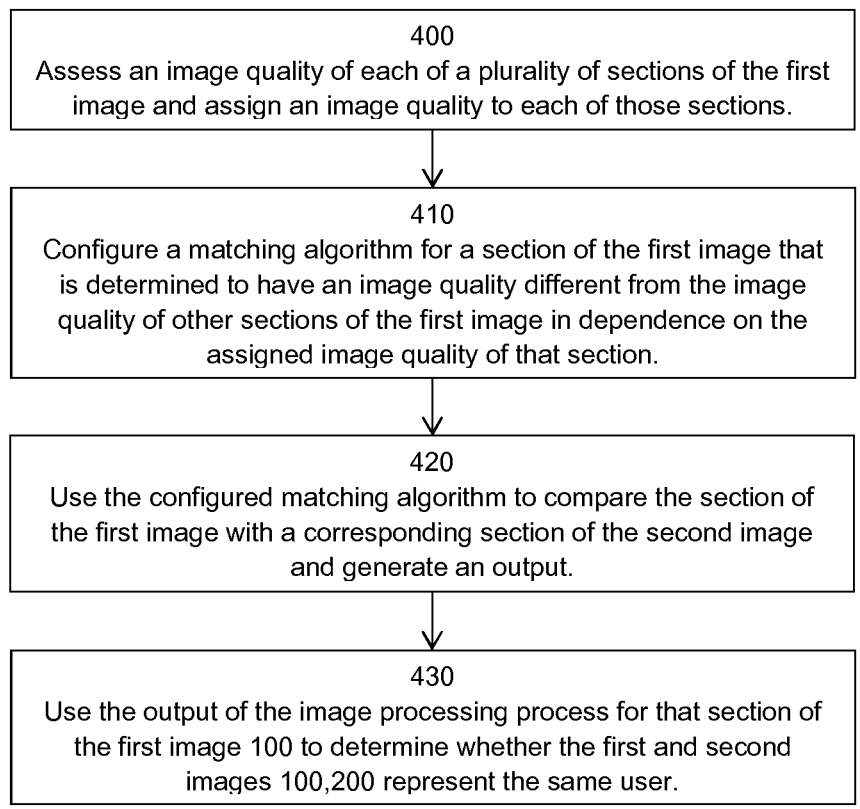
FIG. 4 shows a flow chart of a method according to an arrangement of the present application.

The processing system 310 is arranged to compare the first image 100 to the second image 200 to determine whether they represent the same user (i.e. to determine whether the user 210 represented in the second image 200 is the previously authenticated user associated with the identity document 110). FIG. 4 shows a flow chart illustrating steps involved in such a comparison process.

Figure 5:
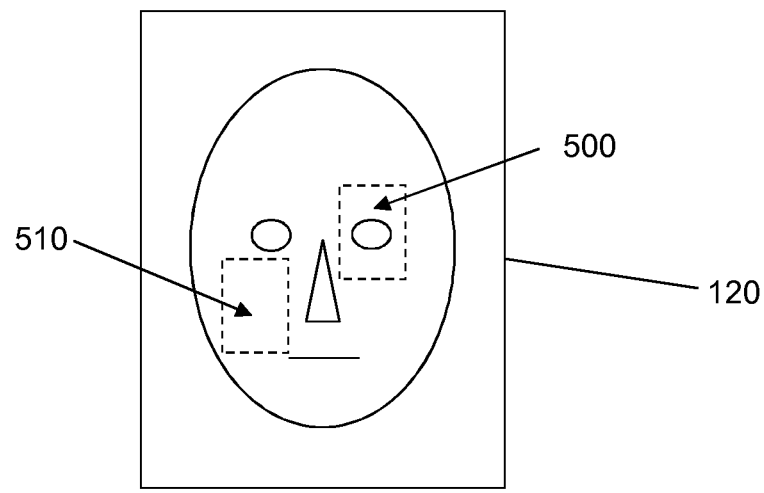
FIG. 5 illustrates schematically a close up of an exemplary first captured image according to an arrangement of the present application.

At step 400, the processing system 310 is configured to assess an image quality of each of a plurality of sections of the first image 100, whereby to assign an image quality to each of the plurality of assessed sections of the first image 100. FIG. 5 shows a close-up of the first image 100, showing the captured picture 120 of a previously authenticated user associated with the identity document 110. Two exemplary sections 500, 510 of the image are indicated by dashed lines, the first 500 covering the eye area, and the second 510 covering the cheek area. In this example, each of these sections 500, 510 is assigned an image quality. The assigned image quality may correspond to the suitability of that section for facial matching, which can be affected by a number of factors as discussed above.

Typically, images are made up of an array of pixels having different intensities. In one arrangement, the quality of a section, such as the first section 500, may be assessed using wavelet processing to identify the variation in pixel intensity between pixels within a given area within that section.

More specifically, considering the first section 500 as an example, a grid of wavelets can be convolved with the pixels that make up the first section 500 whereby to provide responses indicative of the change in pixel intensity over the area covered by the wavelet. By using wavelets of differing sizes, features of the image can be identified and the "sharpness" of those features can be determined.

For example, a large change in pixel intensity over a relatively small area would indicate a relatively sharp feature, whereas a smaller change over a larger area would indicate a relatively unclear feature. Sections of the image that contain sharp features typically contain detail that can be used for facial matching. For example, images of eyes, which typically contain a great deal of detail in a relatively small area, usually contain relatively large variations in pixel intensity over a small region. Images of cheeks, on the other hand, which typically contain little in the way of detail that is useful for facial matching, usually contain very little variation in pixel intensity over the whole area. Thus sections of the image 100 having sharper features (i.e. a greater variation in pixel intensity per unit area) may be assigned a higher quality than sections with fewer sharp features. In this case, the first section 500 would most likely be assigned a higher image quality than the second section 510.

Further, the sharpness of the features identified in a given section, and/or other characteristics of the identified features, may be compared to the characteristics of features within a set of training images. The set of training images may comprise one or more sets of images with "desired" features and one or more sets of images with "undesirable" features. These sets of images can be used to further assess the quality of a section of an image 100. For example, where a section of the image 100 having sharp features has been identified, the test images may be used to determine whether those sharp features are likely to be facial features or whether they are likely to be non-facial features, such as security marks printed over the face, for example. A set of images with desired features may be made up of a set of images of human faces that are suitable for facial comparison. Sets of images having undesirable features may include, for example, sets of images of human faces with features such as security marks imposed thereon. Sets of training images may also be used to train the processing system 310 to distinguish between the face of a person with light skin, which was captured in low lighting conditions, and the face of a person with darker skin.

Through use of such training images, the processing system 310 can, therefore be trained to distinguish between the characteristics of desirable facial features and the characteristics of un-desirable features. In other words, training images can be used to identify the sections of an image that are likely to be of most use when performing an image comparison. In this arrangement, sections 500, 510 that have been determined to include desirable features may be assigned a high image quality relative to sections with fewer desirable features, and/or sections with more undesirable features.

As another example, the quality of a section may alternatively or additionally be assessed by determining the number of pixels per unit area in a given section. It will be appreciated that there are other indicators of image quality, and these may be used as an alternative or in addition to the above to assign image qualities to sections of the first image 100.

After the processing system 310 has assigned image qualities to a plurality of sections of the first image 100, the processing system 310 then performs an image processing process for at least one section of the first image 100 that is determined to have an image quality different from the image quality of the other assessed sections of the first image 100. The processing process comprises steps 410 and 420. Considering the first section 500 as an example, at step 410, the processing system 310 configures a matching algorithm for the first section 500 in dependence on the assigned image quality of that section 500.

At step 420, the processing system 310 uses the configured matching algorithm to compare the first section 500 with a corresponding section of the second image 200 (i.e. a section of the second image 200 that covers the same part of the face as is covered by the first section 500 of the first image 100).

The section of the second image 200 that corresponds to the first section 500 of the first image 100 may be determined using conventional facial recognition techniques such as those described above to identify the major features of a human face, such as the eyes, nose, and mouth, in each of the first and second images 100, 200. These features may be used as anchor points to fit a grid of sections to each of the images 100, 200 such that each section in the grid covers a predetermined portion of the face.

The output from the matching algorithm for the first section 500 of the first image 100 may be indicative of the probability that the first section 500 represents a part of a face that is also present in the corresponding section of the second image 200. The matching algorithm may be configured to compare the first section 500 to the corresponding section of the second image 200 by comparing the features (or characteristics of the features) within the first section 500 with the features (or characteristics of the features) within the corresponding section of the second image 200 to determine whether there is a match.

More specifically, in one arrangement, the processing system 310 may compare the first section 500 of the first image 100 to the corresponding section of the second image 200 by first analyzing the variation in pixel intensity as discussed above. The variation in the pixel intensity across the first section 500 may be represented numerically. This process may be repeated for the corresponding section of the second image 200 thereby generating a numeric representation of the change in pixel intensity across this section of the second image 200. The two numeric representations may then be compared to determine whether the two sections have the same feature characteristics.

To speed up the comparison process, and reduce the computational demand on the processing system 310, the size of the numerical representations of the sections may, in one arrangement, be reduced using discriminant analysis.

The image processing process may be repeated for multiple sections of the first image 100, in which case the matching algorithm is configured according to the assigned image qualities of multiple sections of the first image 100 and is used to compare those sections of the first image 100 to the corresponding sections of the second image 200 thereby generating multiple outputs.

Finally, at step 430, the processing system 310 is configured to use the one or more outputs from the matching algorithm to determine whether the first image 100 includes an image of the user 210.

Assessing the image quality of sections of the first image 100 and configuring the matching algorithm in dependence upon the assigned image quality of at least one of those sections means that the image qualities of the different sections can be taken into account when assessing the significance of a close match (or lack thereof) between a given one of those sections and the corresponding section of the second image 200.

In an example where the first section 500 of the first image 100 is assigned a higher image quality than the second section 510, greater significance may, for example, be attached to a close match (or lack thereof) between the first section 500 and the corresponding section than would be attached to a close match (or lack thereof) between the second section 510 and the corresponding section of the second image 200.

This is particularly useful where the first image 100 is of generally low quality (as is typically the case with captured images of pictures 120 on identity documents 110, as discussed above). This is because, if the first image 100 were to be compared to the second image 200 as a whole, strong correspondence (or lack thereof) between parts of the first image 100 that have little detail (such as the cheeks for example), may bias the overall comparison result, leading to an incorrect determination as to whether the images 100, 200 represent the same user 210. In other words, by considering the quality of the first image 100 section-by-section, a matching algorithm can be configured that takes into account the biasing effect of sections of an image that have a low image quality.

In one particular arrangement, the matching algorithm may be configured to take these biasing effects into account by weighting the outputs for the sections of the first image 100 and then combining the weighted outputs to generate a value indicative of the probability that the first and second images 100, 200 represent the same user 210. The weightings for outputs for sections of the first image 100 with a higher image quality can be set higher than the weightings for outputs for sections with a lower image quality. The combined weighted outputs may then be compared to a threshold value to determine whether the images represent the same user.

In one arrangement, the matching algorithm may be configured for sections of the first image that have been determined to have an image quality above a predetermined threshold. In this case, those sections with assigned image qualities above that threshold are compared to the corresponding sections of the second image 200, and the sections with assigned image qualities below the threshold are not compared to the second image 200. This reduces the computational demand on the processing system 310 and prevents strong similarities or differences between those low-quality sections and the corresponding sections of the second image 200 from biasing the overall comparison result.

If it is determined that the first and second images 100, 200 are images of the same user 210, the user 210 of the device 300 can be authenticated as the user associated with the identity document 110. Before the user 210 is authenticated as the user associated with the identity document 110, the processing system 310 may carry out further steps to verify that the image 100 is an image of a valid identity document, as will be described in more detail below.

Although the above method for comparing two images to determine whether they represent the same user 210 has been described in the context of comparing a picture 120 in a first image 100 of an identity document 110 to a second image 200 of a user 210 of a device 300, it will be appreciated that the method is applicable for comparing any two images to determine whether they represent the same entity. As discussed above, the method is particularly useful where the first image 100 is a low-quality image, such as any image that was previously captured on a reprographic medium other than one directly associated with the processing system 310, as the biasing effects of the low-quality sections of the image on the overall comparison result can be reduced.

In general, therefore, the method may comprise a preliminary step of assessing the overall image qualities of the two images to be compared and designating the image with the lower overall image quality as the first image 100 and the image with the higher overall image quality as the second image 200 before carrying out the image matching process as described above.

When it is known that the one of the two images to be compared is an image 100 of an identity document 110, it may be assumed that the image of the identity document 110 is the lower-quality image (as discussed above, the pictures 120 on identity documents 110 are, in general, of very poor quality for the purpose of facial matching).

More generally, however, where the above method is used to compare any two facial images, the image qualities may be assessed with respect to the suitability of the images for facial comparison. Factors that affect the suitability of an image of a person for facial comparison include: whether that person was stationary when the image was captured, whether the person was looking at the camera (or other image capture device) when the image was captured, whether the person had their eyes open, and whether the person is wearing items that obscure their face, such as glasses. As mentioned above, other factors include the resolution of the image and the illumination of the person's face.

In one arrangement, the above-mentioned set of training images may be used to assess the quality of the images 100, 200. The use of training images to train the processing system 310 to recognize certain "desirable" features and to distinguish them from other similar "undesirable" features, as discussed above. For this purpose, training images may be used to train the processing system 310 to recognize images where lighting is sub-optimal, for example. Thus, the processing system 310 may determine which of two images to be compared is the lower quality image by determining which of those images has the most "desirable" features.

As an alternative or additional preliminary step, the processing system 310 may compare the image quality of the two images to a threshold quality and may, for example, request an alternative image if the image quality of one of the images is below the threshold quality. It is particularly useful to compare the quality of the second image 200 to a threshold quality, because a better second image of the user 210 may be captured by, for example, instructing the user 210 of the device 300 to find better lighting conditions.

In addition or as an alternative, in the event that the first image 100 is determined not to be an image of the user 210 represented in the second image 200, the device 300 may be configured to capture a further image of the user 210 and to compare this image to the first image 100 as described above. Again, the user 210 may be given directions as to how to improve the quality of the second image 200. Thus, if the first image 100 was actually an image of the user 210, but was determined not to be an image of the user 210 due to the poor image quality of the second image 200, then the likelihood of the comparison result being correct for the further image of the user 210 can be increased by capturing a further second image, of suitably improved image quality.

As mentioned above, before the user 210 is authenticated as the user associated with the identity document 110, the processing system 310 may carry out steps to verify that the image 100 is an image of a valid identity document. In one exemplary arrangement, the identity document 110 may comprise a chip which stores data relating to the identity of the user associated with the identity document 110, and this data may be used to verify that the image 100 is an image of a valid identity document. The data may comprise, in particular, a digital image of the user associated with the identity document 110 and/or other data for the user, such as the name, address and/or date of birth of the user associated with the identity document 110. Typically, this data will be encrypted within the chip.

In one arrangement, the device 300 may be configured to retrieve the data from the chip and to pass this data to the processing system 310. The processing system may then use this data to validate the identity document 110. In effect, therefore, the processing system is configured to derive data for use in validating the identity document from the chip of the identity document, via the device 300. Where the data is encrypted, the data may be decrypted by the processing system 310 before it is used to validate the identity document.

As a particular example, where the data stored in the chip of the identity document 110 comprises a digital image of the user associated with the identity document 110, the processing system 310 may be configured to compare the digital image from the chip to the first image 100. By this method, the processing system 310 is able to determine whether the picture 120 on the identity document 110 has been tampered with (e.g. replaced with a picture of a different user). If the first image 100 and the image derived from the chip are determined to represent the same user, then the processing system may determine that the identity document 110 in the first image 100 is valid.

Alternatively, or additionally, the digital image derived from the chip of the identity document 110 may be compared to the second image 200 (i.e. the image 200 of the user 210 of the device 300). This comparison may be performed in place of the comparison between the first and second images 100, 200 described above, or in addition to the comparison between the first and second images 100, 200. When such a comparison is performed in addition to the comparison between the first and second images 100,200, this can improve the reliability of the user authentication method. In a specific arrangement, the comparison result for the second image 200 and the first image 100 may be combined with the comparison result for the second image 200 and the image derived from the chip. The combined result may be used to determine whether the user 210 of the device 300 is likely to be the user associated with the identity document 110.

In one arrangement, the data stored in the chip of the identity document 110 may be retrieved using near field communication (NFC). In such an arrangement, the device 300 may comprise an NFC reader component which is configured to retrieve the data stored in the chip when in close proximity to the chip. Alternatively, the device 300 may be communicatively connected to a separate NFC reader via, for example, a USB port.

In one specific embodiment the identity document 110 may be an electronic Machine Readable Travel Document (eMRtd), or a similar identity document 110 which complies with the ICAO (International Civil Aviation Authority) eMRtd standards. Such identity documents comprise a chip, which can be used, inter alia, to verify the validity of the identity document 110. There are a number of methods by which the validity of such an identity document 110 can be verified using the chip, as will be detailed below. However, first, an eMRtd, or a similar identity document 110 which complies with the ICAO eMRtd standards will be described in more detail.

The chip of an eMRtd stores first data in a "Logical Data Structure". The first data may include for example data corresponding to data visible on the surface of the identity document 110. As a specific example, the first data may comprise data corresponding to data that is encoded in optical character recognition (OCR) format in a machine readable zone (MRZ) of the identity document 110.

The chip also stores a "Document Security Object", which is for use in verifying the validity of the identity document. The Document Security Object comprises a hash of the first data. It may also comprise a public key of the identity document 110, as will be described in more detail below.

The Document Security Object is signed by the issuing authority; that is to say, the Document Security Object is encrypted with a private key of the issuing authority. The issuing authority may be, for example, a government.

In order to verify the validity of such an identity document 110, the device 300 may be configured to read the first data and the Document Security Object from the chip of the identity document 110. The data may be read e.g. via a chip reader, such as a near field communication reader, that is integral with, or connected to the device 300. This data may then be sent to the processing system 310. Upon receipt, the processing system 310 may be configured to identify the authority who issued the identity document 110 and obtain their public key.

The issuing authority can be identified from data derived from the identity document 110. For example, the issuing authority may be identified by data encoded in a Machine Readable Zone of the identity document 110. In this case, the processing system 310 may be configured to analyze the first image 100 and extract the data identifying the issuing authority using Optical Character Recognition techniques, for example.

Having identified the issuing authority, the public key may then be obtained, for example, from a Public Key Directory maintained by a trusted third party.

Alternatively, the public key may be stored on the chip, and may have been read by the device 300 and sent to the processing system 310, together with the first data and the Document Security Object.

Alternatively, the processing system 310 may have been pre-configured with the public key for the issuing authority.

Irrespective of how the public key is retrieved, the processing system 310 may be configured to verify the validity of the identity document 110 by first decrypting the Document Security Object using the public key of the issuing authority. The processing system 310 can thereby verify that the Document Security Object is a valid Document Security Object.

Once decrypted, the processing system 310 may be configured to compare the decrypted Document Security Object to a hash of the first data. If there is correspondence, the processing system 310 can verify that the first data has not been tampered with, and that the identity document 110 is valid.

In addition to the above, the data stored in the chip (i.e. the first data, the Document Security Object, and any other data stored thereon) may be encoded. In one specific embodiment, the data may have been encoded using a key derived from data that is visible on the surface of the identity document. Such visible data could include, for example, data encoded in an OCR format in a MRZ of the identity document 110.

Thus, in order to read the first data and the Document Security Object from the chip of the identity document 110, the device 300 may first be required to derive the visible data from the surface of the identity document. This data could be derived directly from the surface of the identity document 110, or from the first image of the identity document 100, e.g. using OCR techniques.

If the processing system 310 is successfully able to decode the data stored on the chip using the data visible on the surface of the identity document 110, it can be determined that the chip of the identity document 110 has not been replaced, and/or that the visible data on the surface of the identity document 110 has not been altered.

The chip may further comprise a secure element that contains a private key for the identity document 110. In this case the device may send a challenge to the chip, which causes the chip to respond with a response that is signed with the private key of the identity document 110.

Upon receipt of the signed response, the processing system 310 may be configured to verify, using the public key of the identity document 110 that the response has been signed by the private key of the identity document 110. This provides assurance that the data stored on the chip of the identity document 110 has not been duplicated from another chip.

As will be appreciated, where the processing system 310 is a component of the device 300, the validity of the identity document will be verified by the device 300 itself. Where the processing system 310 is remote from the device 300, the verification will be carried out remotely, and the device 300 is configured to send the data derived from the identity document 110 which is required by the processing system 310 to verify the validity of the identity document 110 to the processing system 310.

Alternatively or additionally to the above-described validity checks, which make use of data stored on a chip of the identity document 110 and/or data visible on the surface of the identity document 110, validity checks may be carried out through use of data that is stored in a storage device remote from the identity document 110. As an example, said stored data may comprise an image of the user associated with the identity document 110, and this image may be retrieved from the remote storage device, and compared to one or both of the first and second images 100, 200 whereby to verify whether the identity document 110 is valid and to improve the reliability of the user authentication result. Such a remote storage device could be, for example, a storage device held by a government body, which stores validated images of citizens.

In one specific example, the image stored by the remote storage device may be retrieved through use of data derived from the identity document 110 which uniquely identifies the user associated with the identity document 110. In other words, the image may be retrieved through use of a unique user identifier derived from the identity document. Such a unique identifier could include, for example, a unique user identification code, such as a passport number or a national insurance number and could be derived from the surface of the identity document 110 and/or a chip of the identity document 110, as described above.

In the present example, the image stored by the remote storage device may be retrieved by first sending the derived unique user identifier to the remote storage device whereby to identify the user associated with the identity document 110 to the remote storage device. The remote storage device may then use the unique user identifier to retrieve the image of the user of the identity document 110 and may send the retrieved image to the device 300 and/or the processing system 310.

Figure 6:
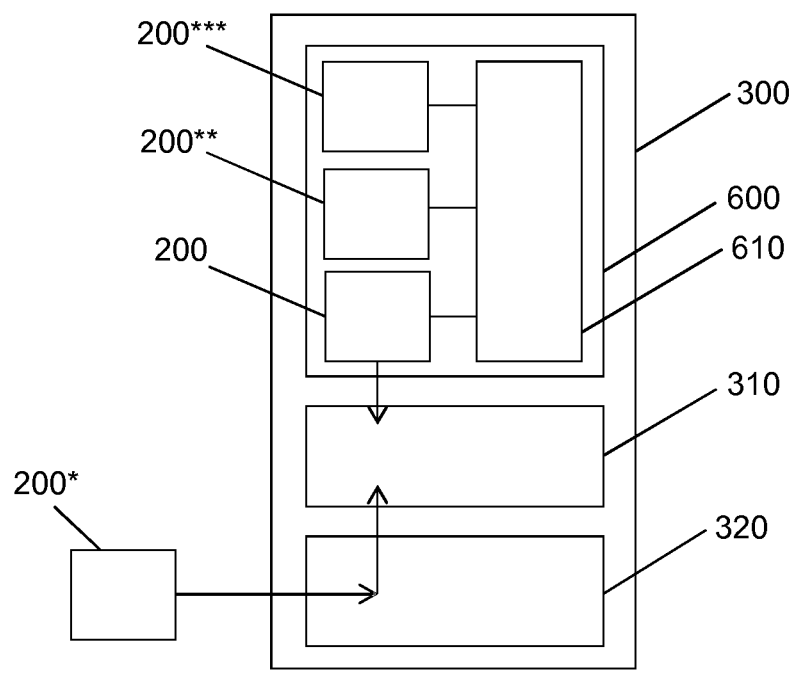
FIG. 6 illustrates schematically an exemplary device configured to carry out a method according to an arrangement of the present application.

According to another embodiment of the present application, in one arrangement, the processing system 310 has access to a storage device 600, as shown in FIG. 6. Once it has been determined that the first image 100 of the identity document 110 and the second image 200 of the user 210 of the device 300 represent the same user, the second image 200 of the user 210 may be stored as a validated image of the user associated with the identity document 110 in the storage device 600 as shown in FIG. 6.

As discussed above, typically, the second image 200 captured by the device 300 will be of a higher quality than the first image 100 of the identity document 110. In one arrangement, if a user of the device 300 later wishes to authenticate himself on the device 300 as the previously authenticated user 210 associated with the identity document 110, the processing system 310 may capture a subsequent image 200* of the user of the device 300 and may compare the subsequent image 200* with the validated second image 200 to determine whether they are images of the same user. The images may be compared according to the method described above, or alternatively, a conventional facial matching algorithm may be used to compare the images.

In the event that it is determined that the two images 200, 200* represent the same user, the processing system 310 can authenticate the user of the device 300 as the previously authenticated user 210 associated with the identity document 110.

In the present arrangement, therefore, once the user 210 has been authenticated once using an image 100 of an identity document 110, the user 210 need not provide any further images of identity documents 100 in order to authenticate himself in subsequent authentication events. Instead, the user 210 can authenticate himself using the stored validated image 200.

Furthermore, by storing the second image 200, in preference to, for example, the first image 100, the reliability of subsequent authentication events can be improved. This is because the second image 200 will typically be of higher quality than the first image 100 and thus subsequent authentication events are carried out by comparing two relatively high-quality images 200, 200* to one another, rather than comparing a very low quality image (the first image 100) to a higher quality image 200*. In effect, therefore, it could be said that the second image 200 is designated as the higher quality image when it is stored. The validated second image 200 may be used for all subsequent authentication events for the user 210.

Alternatively, in one arrangement, if it is determined that a subsequently captured image 200* of a user of the device 300 represents the previously authenticated user 210 represented in the validated second image 200, the processing system 310 may also store the subsequently captured image 200* as a validated image of the previously authenticated user 210 in the storage device 600. Two exemplary subsequently captured images 200, 200*, which have been previously validated using the second image 200 as being images of the user associated with the identity document 110, are shown schematically as being stored in the storage device 600 in FIG. 6.

The processing system 310 may, in one arrangement, compare the qualities of the validated second image 200 and the subsequently captured image 200* and may designate one as the higher quality image. Thereafter, in a further subsequent authentication event, the processing system 310 may select the designated higher-quality image from the storage device 600 and use that image in the further subsequent authentication event, thereby further improving the reliability of the comparison result in the further subsequent authentication event. In one arrangement, the processing system 310 may assign an image quality to each stored validated image, and each time the processing system 300 validates a user of the device 300, it may select the highest quality validated image from the storage device 600 to authenticate the user.

The stored validated images 200, 200, 200* may be encoded with a one-way encoding algorithm before they are stored. In other words, the images 200, 200, 200* may be stored as numerical representations, from which the original images cannot be derived. When a subsequently captured image 200* of a user of the device 300 is compared to a stored encoded image 200, 200, 200* in the storage device 600, the subsequently captured image 200* is therefore similarly encoded before it is compared to the stored encoded image. As discussed above, the computational demand on the processing system 310 is lower when a comparison is performed between numerical representations of images (e.g. encoded images), rather than between the original images themselves, and thus by encoding images before they are compared, the comparison can be carried out faster.

The processing system 310 may, in one arrangement, generate or otherwise derive a unique user identifier 610 for the user 210 associated with the identity document 110, and may store this identifier 610 together with the second image 200 and any other stored validated images 200, 200* of the user 210. The processing system 310 may use this identifier 610 to retrieve a validated image of the user 210 from the storage device 600 in subsequent authentication events for the user 210.

In one particular example, the unique user identifier 610 for the user 210 may be a hash value derived from details relating to the user 210. The details may, for example comprise the first and last name of the user 210, and the date of birth of the user 210. These details may have been derived by the processing system 310 from the identity document 110 (using optical recognition, for example, or other suitable techniques).

Thereafter, in order to identify the user 210 to the processing system 310 in a subsequent authentication event for the user 210, the processing system 310 need only be provided with details relating to the user 210 that is being authenticated, from which it can then derive the unique user identifier 610. The processing system 310 may alternatively or additionally store certain user details in association with, but separately from, the unique user identifier.

The processing system 310 may also, in one example, send the unique user identifier 610 for the user 210 to a server remote from the processing system 310 whereby to indicate to the server that the user 210 of the device 300 has been authenticated as a user associated with the unique user identifier 610. This is useful, for example, where the user of the device 300 is requesting access to a service provided by the remote server via the device 300, and the remote server needs to verify the identity of the user 210 of the device 300 before it provides the service.

In one arrangement, the processing system 310 may store details relating to the identity of the user 210 associated with the identity document 110 together with the validated image 200 of the user 210 and/or the user identifier 610. These details may, in one example, have been derived from the image 100 of the identity document 110. For example, where the identity document contains details 130 printed or otherwise presented on a surface of the identity document 110 in text form, these details may be extracted using optical character recognition and stored.

Additionally or alternatively, the details may have been derived from data stored in a chip of the identity document 110. More specifically, as mentioned above, an identity document 110 may comprise a chip which stores data that identifies the user associated with the identity document 110 (e.g. the name, address and/or a digital image of the user). The device 300 may be configured to retrieve the data from the chip (using NFC, for example), and pass this data to the processing system 310 to be stored. In other words, the processing system 310 may store data which has been derived from a chip of the identity document 110 via the device 300.

Additionally or alternatively, some or all of the stored details may have been retrieved from a remote storage device using data derived from the identity document. More specifically, the processing system 310 may, in one arrangement, be configured to derive data from the identity document 110 which uniquely identifies the user associated with the identity document 110. In other words, the processing system 310 may be configured to derive a unique user identifier from the identity document 110. The processing system 310 may then send the unique user identifier to the remote storage device, and the remote storage device may use the unique user identifier to retrieve details relating to the user associated with the identity document 110, and to send the retrieved details to the processing system 310.

Additionally or alternatively, the stored details may have been provided by the user 210 of the device 300 when the user 210 was initially authenticated with the first image 100 of the identity document 110.

In addition, or as an alternative, to storing the data derived from the identity document locally at the processing system 310, the processing system 310 may arrange for the details relating to the identity of the user 210 to be stored in a storage device 600 remote from the processing system 310, together with the validated image 200 of the user 210 and/or the identifier for the user 210. The remote storage device 600 could be a storage device of a service provider with which the user is trying to authenticate himself, for example.

In any event, in a subsequent authentication event, when a user of the device 300 is authenticated as the previously authenticated user 210 associated with the identity document 110, these details can be retrieved from the storage device 600. The details may, in one example, be sent to a server remote from the processing system 310 whereby to identify the authenticated user to the server.

As mentioned above with reference to FIG. 3, embodiments may be used to authenticate users on a plurality of devices. When a captured image 200* of a user of a given device is determined to represent a previously authenticated user 210 (either by comparison of the captured image 200* with an image 100 of an identity document 110 or by comparison of the captured image 200* with a stored image 200, 200, 200*, which has been previously validated by the processing system 310 as being an image of the previously authenticated user 210), the processing system 310 may store a unique device identifier for that device, together with the captured image 200*. This unique device identifier could be used in several ways as will become apparent in the following description.

The unique device identifier may be used to identify suspicious user behavior. As an example, if a user of a device tries to authenticate himself as a given previously authenticated user, but the given previously authenticated user has only ever authenticated himself on a different device, then the processing system 310 may be able to determine, from the unique device identifiers for the devices, that the authentication is a suspicious authentication.

Further, when a user of a device wishes to authenticate himself to a server remote from the processing system 310 via the device, the unique user identifier can be sent to a server whereby to identify to the server on which device the user has been authenticated.

According to a further embodiment of the present application, before an image 200 of the user 210 of the device 300 that has been captured by the device 300 is compared to an image of a previously authenticated user (i.e. either an image of an identity document 110 associated with the user, or an image that has been previously validated by the processing system 310 as an image of the user), a check may be made to verify that the second image 200 is an image of an actual person (a "live" user) rather than e.g. a static photograph of the person.

Such a check may comprise the steps of capturing a series of images of the user of the device 300, and comparing successive images to look for differences between successive images that indicate that the images are images of a live user. Once two successive images have been taken that are sufficiently different to indicate that the images are images of a live user, the processing system 310 may use one of those images as the second image 200 in a comparison process as described above.

Carrying out such a check would prevent a user of a device 300 from authenticating himself as a different user by holding a photograph of the different user in front of the image capture component 320.

In one arrangement, before performing a comparison between two successively captured images to look for differences between those images, the images may be analyzed to determine portions of the image that represent a human face, and portions of the image that represent background (sets of training images may be used for such an analysis, as described above). In this arrangement, at least one section of one of the images that is determined to include both facial features and background features may be compared to a corresponding section of the other image to look for movement of the face with respect to the background. Such a comparison may be done on a pixel-by-pixel basis.

Alternatively or additionally, at least one section of one of the images that is determined to include facial features only is compared to a corresponding section of the other image. Such a comparison may look for differences between the images indicative of facial movement, such as blinking.

Pairs of subsequently captured images may be compared either until a pair of subsequently captured images is identified which are sufficiently different as to indicate the images are images of a live user, or until a predetermined number of pairs of subsequently captured images have been compared. Alternatively, pairs of subsequently captured images may be compared until a predetermined time has elapsed.

Figure 7:
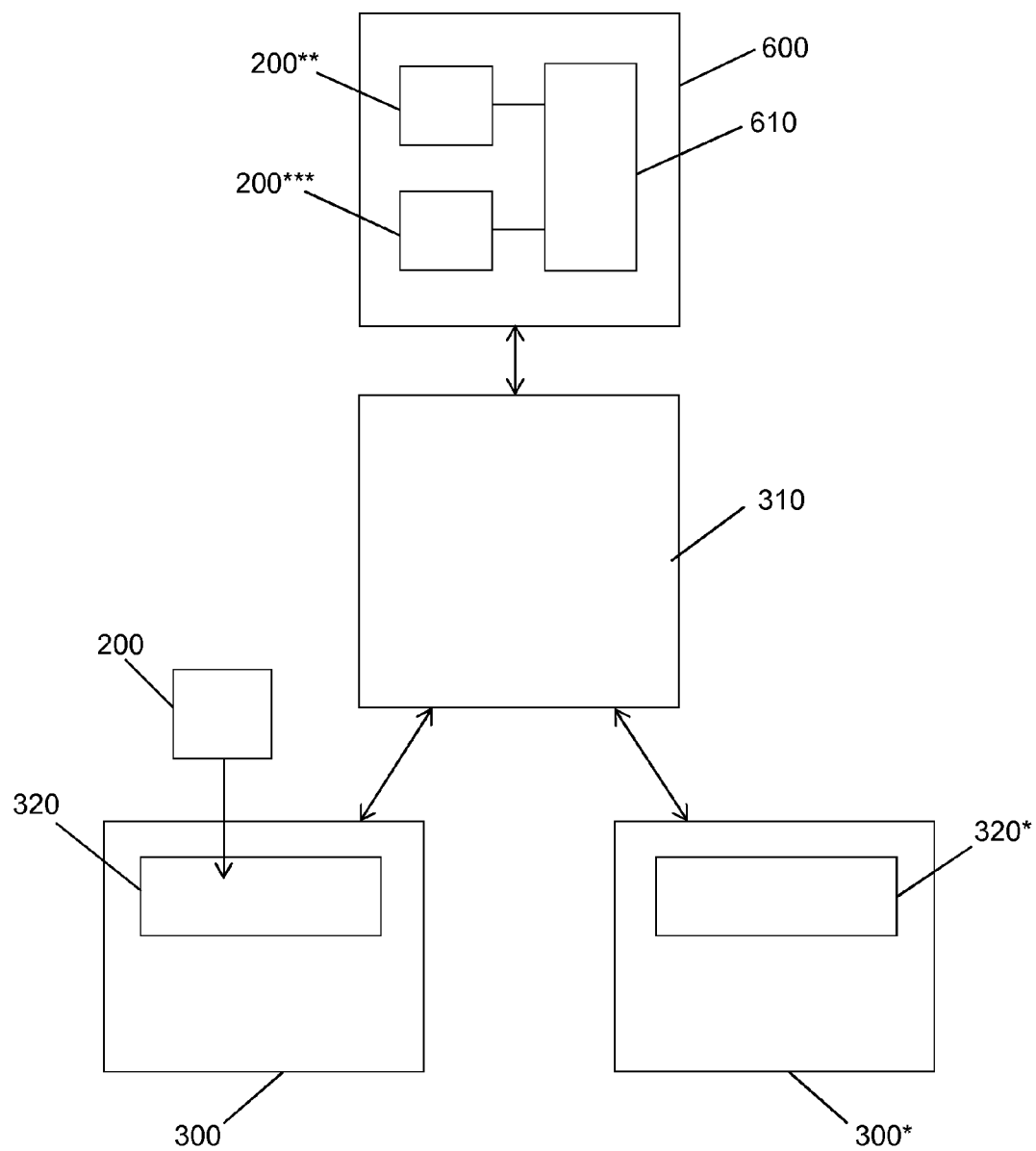
FIG. 7 an exemplary processing system, and exemplary devices configured to carry out a method according to an arrangement of the present application.

As mentioned above, with reference to FIG. 3 in particular, in one arrangement, at least a part of the processing system 310 may be remote from the device 300. FIG. 7 shows schematically an exemplary remote processing system 310 in such an arrangement. The processing system 310 is communicatively connected to a plurality of devices, there being two (300 and 300*) such devices shown in FIG. 7.

In one example, a user of a first of the two devices 300 initiates a user authentication event on the first device 300 whereby to cause the first device 300 to capture an image of the user of the first device 300. The first device 300 may also capture an image 100 of an identity document 110 associated with a user 210, as discussed above. In this arrangement, the first device 300 then sends the two captured images 100, 200 to the processing system 310, and upon receipt, the processing system 310 determines whether the two images 100, 200 are images of the same user. The processing system 310 may carry out the steps as shown in FIG. 4 to determine whether the images represent the same user.

The first device 300 may optionally also retrieve data from a chip of the identity document 110 and may send this retrieved data to the processing system 310.

The authentication event may be associated with an authentication event identifier. The identifier may be generated by the processing system 310 or the first device 300, but in any event, the authentication event identifier is shared between the two components 300, 310 whereby to identify the authentication event to the two components 300, 310.

Once the processing system 310 has determined whether the images represent the same user, the processing system 310 may send an indication to the first device 300, so as to confirm the result of the authentication event, together with the authentication event identifier, whereby to indicate to the first device 300 whether the user of the first device 300 is the user 210 represented in the identity document 110 for that authentication event.

In the arrangement where the first device 300 sends data retrieved from a chip of the identity document 110 to the processing system 310, before confirming the result of the authentication event to the first device 300, the processing system 310 may use the data retrieved from the chip to perform further checks. In particular, where the data retrieved from the chip comprises an image of the user associated with the identity document 110, the processing system may compare this image to one or both of the first and second images 100, 200 as described above. This is useful both in verifying the validity of the identity document 110, and also in increasing the reliability of the authentication result.

In an alternative arrangement, where the processing system 310 has previously authenticated the user 210, the processing system 310 may already have one or more validated images 200, 200* of the user 210 stored in a storage device 600. In this case, therefore, the first device 300 may not send an image 100 of an identity document 110 associated with the user 210 to the processing system 310, but may instead send details identifying the user to the processing system 210 which can be used by the processing system 310 to identify the user 210 and retrieve a validated image of the user 210 from the storage device 600.

As discussed above, in one arrangement, the processing system 310 may store validated images 200, 200* of the user 210 together with a user identifier 610 for the user 210. In this arrangement, the details sent from the first device 300 to the processing system 310 may comprise the user identifier 610 for the user 210, or alternatively, the details may comprise details from which the user identifier 610 can be derived. This latter case is applicable, for example, where the user identifier 610 is a hash value as discussed above with reference to FIG. 6.

Once an validated image 200, 200* of the user 210 has been retrieved from the storage device 600, the processing system 310 compares the image 200 of the user of the first device 300, which was received from the first device 300, to a previously validated image 200, 200* of the user 210 whereby to verify whether the user of the device 300 is the previously authenticated user 210.

Again, the authentication event may be associated with an authentication event identifier, and the processing system 310 may indicate the authentication result, together with the authentication event identifier, to the first device 300.

As will be appreciated, users typically have more than one device, each of which has the means for capturing images. Accordingly, the image 100 of the identity document 110, may be captured by the second device 300*, while the first device 300 is used to take an image of the "live" user. This may be useful if, for example, the second device 300* can capture images that are of a higher quality than the images captured by the first device 300. In this arrangement the authentication event identifier described above may be provided to both devices 300, 300* so that the processing system 310 can identify that images received from the two different devices relate to the same authentication event.

Upon receiving the two images 100, 200, the processing system may be configured to verify that the two images 100, 200, are associated with the same authentication event identifier before comparing them whereby to determine whether they represent the same user, in the manner described above.

As previously mentioned, a given validated image 200 of a previously authenticated user 210 may be stored in conjunction with details relating to the device that is used to capture the image on which the previously authenticated user 210 validates himself. Thus, where a previously authenticated user 210 has a plurality of devices 300, 300*, and authenticates himself via the plurality of devices 300,300*, a plurality of validated images 200, 200* of the user 210 may be stored in a remote storage device 600.

In one arrangement, in a subsequent authentication event for the previously authenticated user 210, the processing system 310 may select a previously validated image 200, 200* of the previously authenticated user 210 from the storage device 600 at least in dependence on the unique device identifier of the device on which the previously authenticated user 210 wishes to authenticate himself (i.e. the "authenticating" device). As an example, the processing system 310 may select a previously validated image 200, 200* of the user 210 that was captured by the authenticating device to validate the user of the authenticating device. This may improve the reliability of the facial matching results, because the two images to be compared are likely to be similar, as they were captured by the same device. The processing system 310 may also determine which of the stored previously validated images 200, 200* to use when validating the user in dependence upon the designated image qualities of the images, as discussed above. For example, the processing system 310 may use a previously validated image 200, 200* that was captured by a device different from the authenticating device if it is of significantly higher quality than a validated image that was captured by the authenticating device.

In further embodiments, the embodiments described above can be applied to a signature verification method and a system for verifying signatures. Such a method and system may provide a greater degree of certainty that an identity of a signatory has been verified, and that the person signing is a person identified as a signatory in the document.

As discussed above, identity can be verified by one or more comparisons of a captured image of the user against images from a source of machine-readable identity data, such as an identity document. The nature of the comparisons required may vary dependent upon the level of certainty required for the identity verification. For example, a comparison may be made between a captured image of a user and an image obtained from a source of machine-readable identity data, such as an identification document or a remote server. Further comparisons may also be included to increase the level of certainty of the verification. For example a digital image retrieved from an integrated circuit within an identity document may also be included in the comparison. Embodiments may also use a registration process, in which a user registers with an identity verification provider using an identity document and can then subsequently be verified by the identify verification provider using data stored in the registration process.

Figure 8:
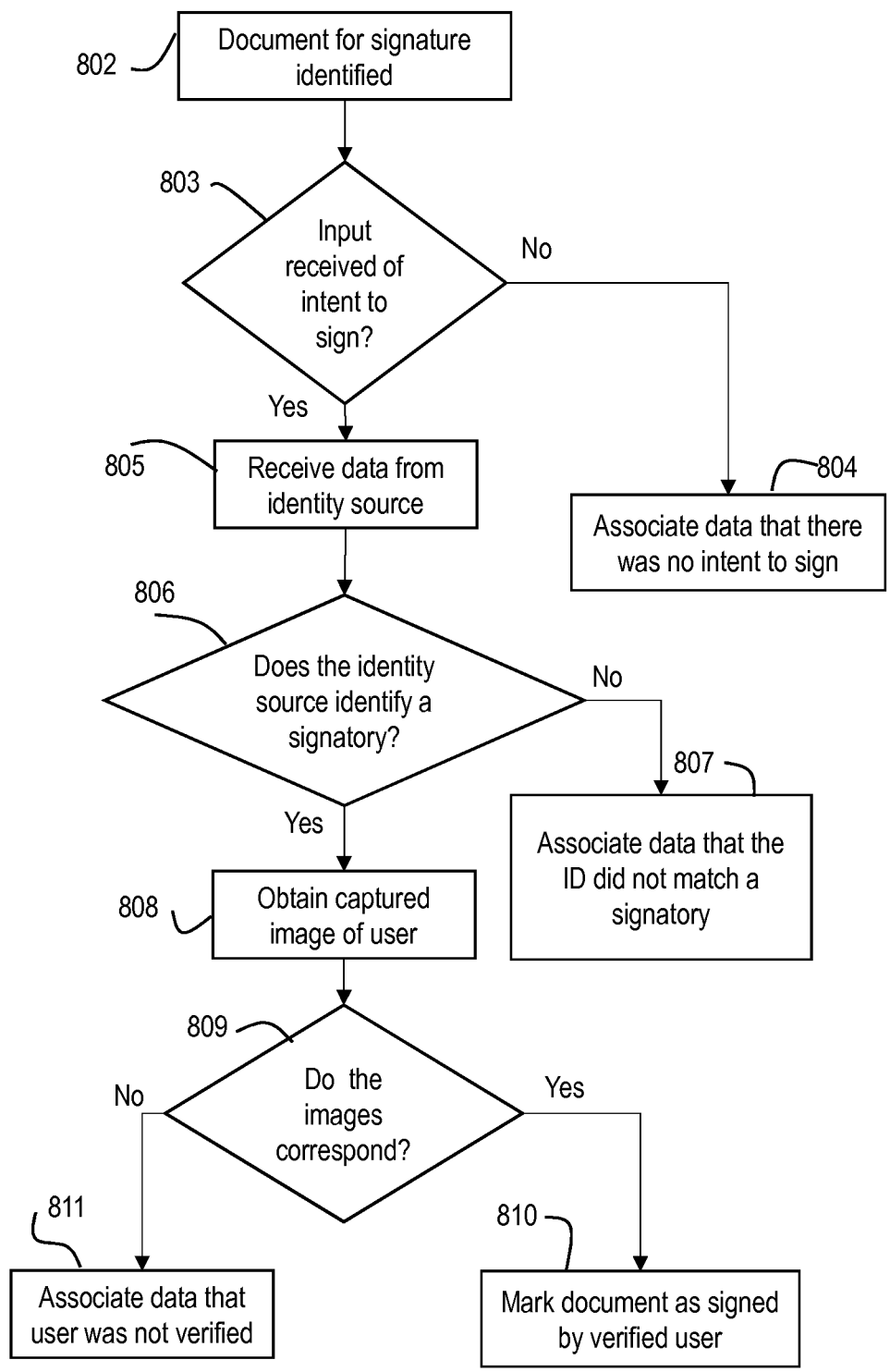
FIG. 8 depicts a flow chart of a method according to an embodiment of the present application.

FIG. 8 depicts one embodiment of a signature verification process carried out by a processing system. The processing system may be remote from or local to a user who wishes to sign the document. For example it may be a server system or a local device, such as computing system, mobile device or wireless device. In the process of FIG. 8, a document originator provides a document requiring signature by at least one signatory. It would be desirable to verify the identity of the signatory when the document is signed.

At step 802 the document for signature is identified. The document may be a digital document in any suitable file format, examples include Portable Document Format (.pdf), Word document (.doc, .docx), and an xml document (possibly using a custom xml schema). The document may also be a paper document. Identification of the document could take place by receiving a copy of document, or by receiving data uniquely identifying the document, for example through an associated ID such as bar code or QR code.

Next, in step 803, an input is monitored for receipt of an input from a user indicating an intention to sign or not sign the document. If the user decides not to sign the document, input data indicating a decision not to sign the document may be received. Alternatively, if the document is not signed after a certain time period, i.e. no input confirming an intention to sign is received after a certain time has elapsed, a decision not to sign may be inferred. If an input indicating decision not to sign is received or a decision not to sign is inferred, data indicating the decision not to sign may optionally be associated with the document at step 804. The data may indicate why the document was not signed, for example the data may indicate whether an input of data or a timeout was the reason the document was not signed. Processing then stops.

If, on the other hand, an input is received indicating an intention to sign the document in step 803, execution proceeds to step 805. In one embodiment the input is generated by the user clicking in a certain region in the document to accept that they wish to sign the document. The input indicating intention to sign may also be the user typing into a text field, where the signature is required. This text might be their name, initials or the date, for example. Alternatively, the input indicating intention to sign might be audio data, such as a user verbally confirming the intention to sign. In an embodiment, the user may be requested to speak aloud that they accept the terms and conditions. Where input data is freeform (for example when a user is free to type or speak whatever they wish) the input data may be processed to establish that it did indicate an intention to sign and did not, for example, state that the user did not wish to sign. In some embodiments the input data indicating an intention to sign may include a name which it is then verified matches a signatory of the document. Data corresponding to the input indicating an intention to sign may optionally be associated with the document for future reference, for example by embedding it in document metadata, embedding it inline in a digital document, and storing it in a database together with information identifying the document.

At step 805, data representing an image of the user and data of the user's identity is received from a source of machine-readable identity data. The source of machine-readable identity data may be, for example a remote server or an identity document.

In the case of the source of machine-readable identity data being a remote server, at step 805 the remote server is queried for data using, for example, the name of the signatory, an email address of the signatory, the date of birth of the signatory, the address of the signatory or any combination of those or other items. The data for the query could be obtained from, or associated with, the document for signature.

In the case of the source of machine-readable identity data being an identity document, image data of the identity document is obtained. The user may take an image of an identification document using a camera communicably coupled to the device which they are currently using. For example if they are viewing a digital document to be signed on a computer, they may use a camera integrated into the computer or connected to it. Similarly, the user may take the image using a camera in a mobile device. In another embodiment, the identification document may be imaged by a scanner.

Processing then proceeds to step 806, where it is determined whether the identification data received from the source of machine-readable identity data matches the identity of an intended signatory of the document. This could be carried out by a comparison of the name of the intended signatory derived from the document with a name indicated by the identity data. Alternatively, another identifier for the intended signatory may be compared to a corresponding identifier in the obtained identity data. Examples of other identifiers include passport and driver's license numbers.

If it is determined at step 806 that the identity of the intended signatory of the document does not match the identification data, for example if a name associated with the identity data does not match the identity of an intended signatory of the document, data may optionally be associated with the document to indicate an attempt to sign by a person who is not the intended signatory at step 807 and processing ends.

If it is determined at step 807 that the identity of the intended signatory of the document does match the identification data, for example if a name associated with the identity data does match the identity of an intended signatory of the document, processing continues to step 808. At step 808 input data is received of an image of the face of the user taken using a camera communicably coupled to the processing system. If the source of machine-readable identity data was an identity document, this image may or may not be captured on the same imaging device as was used for the first image.

In step 809, the first and second images are compared using some or all of the image comparison techniques discussed above to check that they represent the same user on the identity document. This action may be performed using the same processing system which is executing the method of FIG. 8, or on a remote processing system.

If, at step 809, it is determined that the first and second images represent the same user, it is established that the user is the person identified by the source of machine-readable identity data. Verification data indicative of the identity of the user is generated and associated with the document at step 810. This data includes identity data of the user, so that the identity can later be confirmed. For example a statement "The signatory of this document was verified as X", where X is the name of the signatory, may be added. X may also be other identification data than the name, such as a passport or driver's license number associated with the user. The verification data may be digitally signed by the identity verification provider. The signing of the document may also be associated with a unique signature event number and optionally a time stamp, and the document may be marked with this number to indicate a successful signing event in some embodiments. The image or images captured for use in the determination of step 809 may also be associated with the document and stored for later access. In some embodiments information obtained from the source of machine-readable identity may also be associated with the document and stored for later use, for example the digital image data and/or other data such as a facsimile of the written signature associated with the user. In some embodiments the captured image of the face of the user may be used as the verification data or may be stored with the verification data. Processing then ends.

On the other hand, if at step 809 it is determined that the first and second images do not represent the same user, data is optionally associated with the document indicating that the user was not verified at step 811 and processing ends.

Once processing has ended, the associated data of the outcome of the signing process may be automatically notified to the document originator in some embodiments.

Although the discussion of FIG. 8 has discussed processing in a particular order, this order may be varied in other embodiments and steps may also be carried out simultaneously. For example, the determination that the identity data corresponds to an intended signatory may be carried out after, concurrently or before the determination whether the first image data and the second image data represent the same user. The process of FIG. 8 may be combined with any features of the embodiments discussed above.

In another embodiment, the user may be allowed a predetermined number of attempts to achieve verification in step 809. This may be favorable if the image from the source of machine-readable identity data and/or the captured image were of low quality.

In another embodiment, additional checks may be performed at step 809 to verify that the user is the person identified by the source of machine-readable identity data. For example, when the source of machine-readable identity data is an identity document, data corresponding to the identity document may be retrieved when the identity document was imaged. This process could include determining to whom the document belongs by reading features on the document. These might be extracted using optical character recognition techniques from machine readable zones. In another embodiment, data from the identity document may be retrieved from a chip contained in the document, via Near Field Communication (NFC) or Radio Frequency Identification (RFID) for example. The identity document may comprise a bar code (1D or 2D) or a Quick Response (QR) code which can be read by the device during the imaging of the document. These additional checks may require contacting a remote server to retrieve additional information about the user, or to verify the identity document as genuine. For example, a unique identity document number may be retrieved from the document and transmitted to a remote server along with other data extracted from the identity document. This process could involve comparing the name on the identity document to the name associated with the unique identity document number. Alternatively or additionally the identity document may be associated with a digital image of the user stored either in the chip on the document or on a remote server. Comparing this image to either the first, second, or both images may provide a more secure process.

In another embodiment, a registration process may be used. During the registration process, the identity data received from the source of machine-readable identity data, such as an identity document is stored for later use by the processing system in the event that a successful determination is made in step 809. Subsequent signatures may then be verified using this stored data as the source of machine-readable identity data, so that a user does not need to present an identity document again. Such stored data could be given an expiry date when the user will again be required to present a identify document, for example the expiry date may be an expiry date indicated by the identity document. The stored data may be associated with a unique identifier for the user. This may be a passport number, for example, or a hash value derived from the details relating to the user.

In other embodiments, data from two or more sources of machine-readable identity data may be used in the determinations to provide greater confidence in the identity of the user. For example data from an identity document and stored locally or remotely may be used in the determination of corresponding images in step 809.

In a further embodiment the method may comprise receipt of input confirmation data. For example, if a document is being signed in the presence of another person who is trusted by the document issuer, this other person may provide input data indicating that the person signing the document appears to be person identified by the source of machine readable data and/or on the document to be signed. Such input data could be provided in any suitable way, for example by the other person providing input by a physical input device such as a keyboard or touchscreen, or in some other way which allows input data to be received, such as by verbally giving confirmation. This input data may be used in combination with the automated checks described above. In other embodiments the input data may be used to confirm that the source of machine readable data is for an intended signatory of the document in place of step 806. The other person may be any suitable person who is trusted by the document issuer, for example an employee of the document issuer or a professional person, including an attorney or a notary public.

The above passages have described examples relating to the various embodiments of the present disclosure, whereby to enable the skilled person to readily appreciate the scope of the various inventions taught herein. An overview of these aspects will now be presented.

According to a first embodiment, the disclosure provides a method of verifying, by a processing system, whether a user of a device corresponds to a previously authenticated user, the processing system having access to a first image and a second image, the first image being an image of an identity document comprising an image of the previously authenticated user and data identifying the previously authenticated user, the identity document having been validated in respect of the previously authenticated user by a trusted authority, whereby to previously authenticate the user, and the processing system being arranged to derive, from the identity document, said data identifying the previously authenticated user, wherein the second image is an image captured by the device, the method comprising: comparing said first image to said second image, whereby to determine whether they are images of the same user; and, in the event that it is determined that the first and second images are images of the same user: designating one of the first and second images as the higher quality image; storing said designated image as a validated image of the previously authenticated user in a storage device together with an identifier for the previously authenticated user, said designated image being designated for use in a subsequent verification event for the previously authenticated user and; arranging for said derived data to be stored, together with said identifier for the previously authenticated user, whereby to enable said data to be retrieved in the subsequent verification event for the previously authenticated user.

By storing the designated image in a storage device together with an association with the previously authenticated user, the higher-quality designated image can be used as an alternative to the lower-quality image to verify whether a user of a device corresponds to the previously authenticated user in a subsequent verification event.

Identity documents typically include pictures of the user with which they are associated; however, these pictures are typically of a very poor quality for the purpose of facial image matching. Currently identity documents are typically issued in the form of a card or other reprographic medium; however, the present method is equally applicable where the identity document has an electronic identity component, for example. An example of such an electronic identity component could be a chip within an identity document, which stores data such as a digital representation of an image of the user. As another example, the electronic identity component could be a storage device that is remote from the identity document, and which stores data such as a digital image of the user.

Typically the second image, which is an image captured by the device, will be of a higher quality for the purpose of facial image matching. Thus, by storing the second image, and using the second image in preference to an image of an identity document in a subsequent verification event, the reliability of the subsequent verification result can be improved.

As mentioned, the identity document also comprises data that identifies the user with which it is associated. The data could include, for example, information, such as the name, date of birth, and/or address of the user. By arranging for this data to be stored, together with the identifier for the previously authenticated user, this data can be later retrieved in a subsequent authentication event for the user. Thus, the user need not provide this data in a subsequent authentication event.

The data may, in some cases, be printed or otherwise presented on a surface of the identity document. In such an arrangement, the data can be derived from the image of the identity document using optical character recognition, for example.

Additionally, or alternatively, an identity document may comprise a chip which stores data that identifies the previously authenticated user. In this case, the data may be derived from the identity document using, for example, near field communication. More specifically, the device which was used to capture the image of the identity document may comprise a near field communication reader configured to retrieve the data stored in the chip of the identity document when in close proximity to the chip. In effect, therefore, in this arrangement, the processing system derives the data stored in the chip indirectly, through the near field communication reader of the device.

The data stored in the chip within the identity document may comprise a digital image of the previously authenticated user. Where this is the case, the digital image may be retrieved and compared with the first image to verify that the first image is an image of a valid identity document. By this method, the processing system is able to determine whether the identity document, and in particular the picture of the previously authenticated user on the identity document, has been tampered with. The digital image from the chip may also be stored together with other data derived from the identity document and the identifier for the previously authenticated user.

The data that is derived from the identity document may additionally or alternatively comprise a unique identifier for the user associated with the identity document. In such arrangements the unique identifier may be used to retrieve further data relating to the user from a storage device remote from the identity document. The processing system may use the retrieved data to check the validity of the identity document. As a specific example, the retrieved data may comprise an image of the user associated with the identity document, and the validity of the identity document can be checked by comparing the retrieved image to the image of the identity document (i.e. the "first image") to verify that the picture on the identity document has not been tampered with. Additionally, or alternatively, the retrieved image can be compared to the image of the user of the device (i.e. the "second image"). This may be done to improve the reliability of the user authentication result.

In addition, or as an alternative, to using the retrieved data to check the validity of the identity document, the processing system may arrange for the retrieved data to be stored such that it can be used in subsequent authentication events.

Advantageously, in a subsequent verification event for a user of the device, the method comprises comparing an image that has subsequently been captured by said device as part of the subsequent verification event to said designated image whereby to determine whether the user of the device is said previously authenticated user. Using the higher-quality designated image for the comparison improves the reliability of the result of the subsequent verification event.

In the event that it is determined, in the subsequent verification event, that the user of the device is the previously authenticated user, the method may, in one arrangement, comprise: using said identifier for the previously authenticated user to retrieve the details derived from the first image; and, sending said details to a system remote from the processing system together with said identifier.

In one arrangement, the method comprises encoding said second image using a one-way encoding algorithm prior to storing the encoded second image at said step of storing the second image.

The previously authenticated user may be associated with a unique user identifier, and in the event that it is determined that the first and second images represent the same user, the method may further comprise storing an association between said unique user identifier and the second image. The unique user identifier may be used to retrieve the second image from the storage device if the previously authenticated user subsequently wishes to authenticate himself in a subsequent verification event.

Furthermore, in the event that it is determined that the first and second images are images of the same user, the method may further comprise sending said identifier to a system remote from said processing system whereby to indicate that the user of the device has been verified as the user associated with said identifier. The system remote from the processing system may be, for example, a system associated with a service provider with which the user of the device wishes to authenticate himself.

In yet another arrangement, the device is associated with a unique device identifier, and in the event that it is determined that the first and second images are images of the same user, the method further comprises storing an association between said unique device identifier and the second image.

In the event that it is determined that the first and second images are images of the same user, the method may further comprise sending said unique device identifier to a system remote from said processing system together with an indication that the user of the device has been verified. This may be particularly useful where the system remote from the processing system is associated with a service provider as discussed above, and the service provider provides services directly to devices.

In one arrangement, said step of designating one of the first and second images as the higher quality image comprises the step of comparing the image quality of the first image to the image quality of the second image. Alternatively, in the arrangement above in particular, it may be assumed that the second image is the higher quality image without performing a comparison. However, performing such a comparison of the image qualities of the first and second images ensures that the higher quality image can always be used in a subsequent verification event.

Advantageously, said step of comparing the first image to the second image, whereby to determine whether they are images of the same user comprises: assessing an image quality of each of a plurality of sections of the first image, whereby to assign an image quality to each of said plurality of sections of the first image; for at least one section of the first image that is determined to have an image quality different from the image quality of others of said plurality of sections of the first image: configuring a matching algorithm for that section of the first image in dependence on the assigned image quality of that section of the first image; and using the configured matching algorithm to compare said section of the first image with a corresponding section of the second image, whereby to determine whether the first and second images are images of the same user.

The quality of a section of the first image can be usefully assessed by determining the amount of detail the section contains that is useful for performing an image matching process with another image. Sections of the first image that contain little in the way of detail that is useful for facial matching can bias the overall comparison result between the first image and the second image. By considering the image quality of the first image section-by-section, the sections of the first image that contain little such detail can be identified, and can be taken into account when configuring the matching algorithm, such that the biasing effect of those sections can be reduced.

In one arrangement, the image quality of a said section is determined by identifying features within that section and comparing characteristics of said features to characteristics of features of a predetermined set of training features. The set of training images may comprise one or more sets of images with "desired" features and one or more sets of images with "undesirable" features. A set of images with desired features may be made up of images that are suitable for image comparison. Sets of images having undesirable features may include, for example, sets of images with poor lighting, or blurred features.

Alternatively, or additionally, the image quality of a said section may be determined by identifying features within that section and determining the sharpness of the identified features. A section having features with a relatively high determined sharpness may be assigned a higher image quality than a section having features with a relatively low determined sharpness. The sharpness of a feature can be assessed by, for example, determining the change in pixel intensity over a given area. A large change in pixel intensity over a relatively small area could indicate a relatively sharp feature, whereas a smaller change over a larger area could indicate a relatively unclear feature. Sections of an image that contain sharp features typically contain detail that can be useful for image matching.

Optionally, the first image may be an image that has been captured by or in conjunction with the processing system. Alternatively or additionally, the second image may be an image that has been captured by or in conjunction with the processing system. Where the processing system is a component of a user device, such as a mobile device, the first and/or second image may be captured by an image capture component of the user device, for example. Alternatively, where the processing system is, for example, a remote server, the first and/or second image may have been captured by a device remote from the processing system, which is working in conjunction with the processing system to determine whether the first and second images represent the same entity.

In the event that it is determined that the first and second images do not represent the same entity, the method may comprise successively capturing further images by or in conjunction with the processing system, and comparing each said further image with the first image whereby to determine whether they represent the same entity. This arrangement is particularly advantageous where the second image is an image captured by a mobile device, because the image capture conditions of a mobile device can vary (the lighting, for example, depends greatly on the location and orientation of the device). Thus, if it were erroneously determined that the first and second images do not represent the same entity due to the poor image quality of the second image, a further image can be captured and compared to the first image. The likelihood of the comparison result being correct for the further image of the user can be increased if the further image is of suitably improved image quality.

In one arrangement, the method further comprises comparing the overall image qualities of the two images and designating the image with the lower overall image quality as the first image and the image with the higher overall image quality as the second image. The lower-quality image is likely to have a greater number of sections that contain little in the way of detail that is useful for image comparison, and thus the effectiveness of the above method in improving the reliability of the image matching result can be increased be designating the lower-quality image as the first image.

Arrangements can include additional features, such as, a method of verifying whether the user of a device is a user that has been previously authenticated in respect of the user, in which the device has access to a plurality of images, at least two of which have been captured for the user within a continuous time period, the method comprising: performing a difference detecting process for said at least two images, said difference detecting process comprising: comparing said at least two images whereby to detect differences therebetween; and, determining whether said detected differences are sufficient to indicate that said at least two images correspond to a live user, whereby to output a liveness indicator; and in dependence in the liveness indicator, selectively comparing one of said at least two images to a previously validated image of said previously authenticated user in an image matching process in order to determine whether said compared image corresponds to the previously authenticated user.

Performing such a difference detecting process before comparing a captured image for a user to a previously validated image of the previously authenticated user ensures that the captured image for the user is an image of a live user (i.e.

the user in possession of the device) and is not, for example, an image of a photograph of a user not in possession of the device. If the difference between the two images is not found to be sufficient, then the image matching process may not be performed and the user may not be verified as the previously authenticated user.

In the event that said detected differences are determined not to be sufficient to indicate that said at least two images correspond to a live user, the method comprises repeating said difference detecting process for a different two images which have been captured for the user within said continuous time period whereby to output a liveness indicator for said two different images, and selectively performing an image matching process for one of said different two images in dependence upon the liveness indicator. This is useful in the case that the user of the device is remaining particularly still as it allows more time for movement of the user to be detected.

Furthermore, the method may further comprise repeating said difference detecting process for a plurality of different images that have been captured within said continuous time window. Thus, in effect, the user of the device is given a predetermined time in which they can "prove" that they are a live user (i.e. they are given a predetermined time to display movements indicative of "liveness"). If the difference detecting process does not find sufficient difference between the images captured in that time window, it may be determined that the images are not images of a live user, and thus the image matching process may not be carried out for the user.

In one arrangement, said step of detecting differences between said at least two images comprises comparing the pixels within a section of a first of said at least two images to the pixels within a corresponding section of the second of said two images, said sections being sections that have been determined to include facial features. Changes in the expression of the user can be detected in this way and such changes can be used to identify an image of a live user.

Alternatively or additionally, said step of detecting differences between said at least two images may comprise comparing the pixels within a section of a first of said at least two images to the pixels within a corresponding section of the second of said at least two images, said sections being sections that have been determined to include both facial features and background features. Changes of the position of the user with respect to the background can be detected in this way and such changes can be used to identify an image of a live user.

According to a further embodiment the disclosure provides a processing system for use in verifying whether a user of a device corresponds to a previously authenticated user, the processing system having access to a first image and a second image, the first image being an image of an identity document comprising an image of the previously authenticated user and data identifying the previously authenticated user, the identity document having been validated in respect of the previously authenticated user by a trusted authority, whereby to previously authenticate the user, and the processing system being arranged to derive, from the identity document, said data identifying the previously authenticated user, wherein the second image is an image captured by the device, the processing system being configured to: compare said first image to said second image, whereby to determine whether they are images of the same user; and, in the event that it is determined that the first and second images are images of the same user: designate one of the first and second images as a higher quality image; store said designated image as a validated image of the previously authenticated user in a storage device together with an identifier for the previously authenticated user, said designated image being designated for use in a subsequent verification event for the previously authenticated user and; arrange for said derived data to be stored, together with said identifier for the previously authenticated user, whereby to enable said data to be retrieved in the subsequent verification event for the previously authenticated user.

In another embodiment, there is provided a method of determining whether a user of a mobile device corresponds to a previously authenticated user, the user having been previously authenticated via an identity document comprising: a photographic image of the previously authenticated user, the photographic image being visible on said identity document; and an integrated circuit component storing data representative of a digital image of the previously authenticated user, the method comprising: causing a chip reader connected to or integral with the mobile device to access the integrated circuit component, whereby to retrieve said data representative of a digital image of the previously authenticated user; causing a camera connected to or integral with the mobile device to capture a first image, the first image corresponding to an image of a portion of the identity document containing said photographic image visible on the identity document; causing a camera connected to or integral with the mobile device to capture a second image, the second image corresponding to a user of the mobile device; and, arranging for said retrieved data and data indicative of said first and second images to be compared, whereby to determine whether the first image, the second image, and the digital image represent the same user; and, in the event that it is determined that the first image, the second image, and the digital image represent the same user, forming an association between the previously authenticated user, and the mobile device.

In a further embodiment, there is provided apparatus for use in determining whether a user of a mobile device corresponds to a previously authenticated user, the user having been previously authenticated via an identity document comprising: a photographic image of the previously authenticated user, the photographic image being visible on said identity document; and an integrated circuit component storing data representative of a digital image of the previously authenticated user, the apparatus comprising: at least one processor; and at least one memory including computer program code; the at least one memory and the computer program code being configured to, with the at least one processor, cause the apparatus to: cause a chip reader connected to or integral with the mobile device to access the integrated circuit component, whereby to retrieve said data representative of a digital image of the previously authenticated user; cause a camera connected to or integral with the mobile device to capture a first image, the first image corresponding to an image of a portion of the identity document containing said photographic image visible on the identity document; cause a camera connected to or integral with the mobile device to capture a second image, the second image corresponding to a user of the mobile device; arrange for said retrieved data and data indicative of said first and second images to be compared, whereby to determine whether the first image, the second image, and the digital image represent the same user; and, in the event that it is determined that the first image, the second image, and the digital image represent the same user, form an association between the previously authenticated user, and the mobile device.

The step of comparing the retrieved data and the data indicative of the first and second images, may be performed on the basis of every possible permutation of the retrieved data and the data indicative of the first and second images. Alternatively, a less processor intensive process may be employed, in which the retrieved data is compared to the data indicative of the first image, and separately to the data indicative of the second image.

By forming an association between the previously authenticated user and the mobile device, the mobile device is, in effect, verified as the mobile device of the previously authenticated user. The association may be used for several purposes.

As a first example, the association may be used by a third party who provides access to user-restricted services or resources via mobile devices. More specifically, the association may be used by a third party to determine the mobile device on which to provide access to a service/resource that has been requested by the previously authenticated user. In this case, upon determining that the first image, the second image, and the digital image represent the same user, the third party may be informed of the mobile device with which the previously authenticated user is associated. In this way, the third party can be sure that the services or resources they provide are being supplied to a mobile device that is held by the previously authenticated user.

As another example, the association may be used to identify suspicious user behavior. For example, if a user of a first mobile device is purporting to be a previously authenticated user; however, the previously authenticated user is associated with a different mobile device, and has only ever authenticated himself on that device, then the user of the first mobile device may be identified as a suspicious user. In this case, more stringent verification checks may be carried out on the identity document supplied by the user of the first device.

As a further example, the association may be used to authenticate the user of the mobile device in a subsequent authentication event for that device. More specifically, upon determining that the first image, the second image, and the digital image represent the same user, the data representative of the second image, and/or the data representative of the digital image retrieved from the chip of the identity document, may be stored as a validated image of the previously authenticated user, together with an association with the mobile device.

In a subsequent authentication event for the mobile device, the stored image of the previously authenticated user that is associated with the mobile device may be retrieved and compared to a newly captured image of the user of the mobile device. In this way, it can be determined whether the current user of the mobile device is the previously authenticated user associated with the mobile device without the user being required to supply an identity document. In this case, therefore, the association between the mobile device and the previously authenticated user is, in effect, an association between the mobile device and an image that has been verified as an image of the previously authenticated user.

In the specific arrangement where the second image (i.e. the image of the previously authenticated user captured by the mobile device) is stored as a validated image of the previously authenticated user at a storage device remote from the mobile device, such an association between the mobile device and the second is of particular use. This is because a particular user will typically have a plurality of mobile devices on which he authenticates himself. Thus, the remote storage device may store multiple "second" images of the previously authenticated user; each of which were captured by a different mobile device. By storing an association between each of the second images and the mobile device that captured the second image, the "correct" second image can be retrieved from the storage device when the user attempts to authenticate himself via one of those devices. In other words, when a user attempts to authenticate himself by a particular mobile device, the second image that was captured by that mobile device may be retrieved from the storage device and compared to a newly captured image of the user of that mobile device. By comparing images that were captured by the same device, the reliability of the image matching result can be improved.

Irrespective of how the association is used, the association formed between the previously authenticated user, and the mobile device may be formed, for example, by storing an association between a unique device identifier for the mobile device and data that uniquely identifies the previously authenticated user. The data that uniquely identifies the previously authenticated user could comprise data representative of a digital image of the previously authenticated user, as described above. The unique device identifier and the data that uniquely identifies the previously authenticated user may be stored by a storage device remote from the mobile device.

By determining whether the first image, the second image, and the digital image represent the same user, it can be determined up to a high level of confidence whether the user of the mobile device is the previously authenticated user.

More specifically, by performing a three-way comparison between the retrieved data and the data indicative of the first and second images, the reliability of the image matching result is improved as compared to performing a two-way comparison between e.g. the retrieved data and the second image.

Additionally, by comparing the data representative of the first image (i.e. the image of the photographic image of the previously authenticated user visible on the identity document), and the data representative of a digital image of the previously authenticated user stored on the integrated circuit component, the validity of the identity document can be verified. For example, any alterations made to the photographic image visible on the identity document can be detected. Additional validity checks may also be performed.

The processing system in any of the above embodiments may comprise at least one processor and at least one memory including computer program instructions, the at least one memory and the computer program instructions being configured, with the at least one processor, to perform the methods of the embodiments described above. The processing system may be embodied on a user terminal device such as a mobile device, while certain functionalities described above may be embodied on a server system, in which case the images can be received by the server system from a device remote therefrom. Further, the methods described herein may be embodied on a non-transitory computer-readable storage medium storing said computer program instructions.

The above arrangements are to be understood as illustrative examples. Further arrangements are envisaged. For example, in relation to the embodiment where validated images are stored in a storage device 600, the processing system 310 may be configured to assess the image qualities of each validated image and may store an association between those images and their determined image qualities. In a subsequent authentication event, the processing system 310 may select the highest quality image from the storage device 600 and compare this to an image of the user of a device whereby to authenticate that user. Alternatively, the processing system 310 may only store a captured image if it is of higher quality than the validated image of a previously authenticated user with which it was compared. If the captured image is of higher quality, the processing system 310 may replace the previously validated image with the captured image, such that only one validated image of a given user is stored at any one time.

It is to be understood that any feature described in relation to any one arrangement may be used alone, or in combination with other features described, and may also be used in combination with one or more features of any other of the arrangements, or any combination of any other of the arrangements. Furthermore, equivalents and modifications not described above may also be employed without departing from the scope of the application, which is defined in the accompanying claims.

Although at least some embodiments of the arrangements described herein with reference to the drawings comprise computer processes performed in processing systems or processors, the application also extends to computer programs, particularly computer programs on or in a carrier, adapted for putting the methods into practice. The program may be in the form of non-transitory source code, object code, a code intermediate source and object code such as in partially compiled form, or in any other non-transitory form suitable for use in the implementation of processes according to the above arrangements. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processing system referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary arrangements. In this regard, the exemplary arrangements may be implemented at least in part by computer software stored in (non-transitory) memory and executable by the processor, or by hardware, or by a combination of tangibly stored software and hardware (and tangibly stored firmware).

What is claimed is:

1. A method of verifying that a user signing a document corresponds to a previously authenticated user, the previously authenticated user having been previously authenticated using a source of machine-readable identity data, the method comprising:
    receiving, from the source of machine-readable identity data, first digital image data indicative of a first image of the previously authenticated user;
    receiving, from the source of machine-readable identity data, first identity data associated with the first digital image data, the first identity data being associated with the previously authenticated user;
    receiving, from a camera, a captured second image comprising second digital image data, wherein the second image corresponds to the user;
    comparing the first digital image data to the second digital image data;
    determining, based on the comparing of the first digital image data to the second digital image data, that the first image and the second image represent the same user;
    responsive to the first image and the second image being determined to represent the same user, generating verification data indicating that the user is the previously authenticated user, the verification data including second identity data indicative of the previously authenticated user;
    associating the verification data with the document;
    deriving, based on the document, third identity data indicative of an intended signatory of the document; and
    determining, using the first identity data and the third identity data, that the intended signatory corresponds to the previously authenticated user; and
    wherein the step of generating verification data is further responsive to the determining that the intended signatory corresponds to the previously authenticated user.

2. A non-transitory computer-readable storage medium comprising a set of computer-readable instructions stored thereon, which, when executed by a processor of a computing device, cause the computing device to verify that a user signing a document corresponds to a previously authenticated user, the previously authenticated user have been previously authenticated by a source of machine-readable identity data, by:
    receiving, from the source of machine-readable identity data, first digital image data indicative of a first image of the previously authenticated user;
    receiving, from the source of machine-readable identity data, first identity data associated with the digital image data, the first identity data being associated with the previously authenticated user;
    receiving, from a camera, a captured second image comprising second digital image data, wherein the second image corresponds to the user;
    comparing the first digital image data to the second digital image data;
    determining, based on the comparing of the first digital image data to the second digital image data, that the first image and the second image represent the same user;
    responsive to the first image and the second image being determined to represent the same user, generating verification data indicating that the user is the previously authenticated user, the verification data including second identity data indicative of the previously authenticated user;
    associating the verification data with the document;
    deriving, based on the document, third identity data indicative of an intended signatory of the document; and
    determining, using the first identity data and the third identity data, that the intended signatory corresponds to the previously authenticated user; and
    wherein the step of generating verification data is further responsive to the determining that the intended signatory corresponds to the previously authenticated user.

3. The method of claim 1, wherein the third identity data is derived by parsing text data of the document.

4. The method of claim 1, wherein the source of machine-readable identification data is an identity document, the identity document having previously authenticated the previously authenticated user; the method further comprising:
    capturing, using a camera, an image of the identity document, thereby to obtain at least one of the first digital image data and the first identity data.

5. The method of claim 4, wherein the capturing an image of the identity document is to obtain the first digital image data, the method further comprising:
    accessing, by a chip reader, an integrated circuit component of the identity document, thereby to obtain third digital image data indicative of a third digital image of the previously authenticated user;

comparing the second digital image data to the third digital image data; and determining, based on the comparing of the second digital image data to the third digital image data, that the second digital image and the third digital image represent the same user.

6. The method of claim 1, wherein the source of machine-readable identity data is an identity document, the method further comprising:

accessing, by a chip reader, an integrated circuit component of the identity document thereby to receive the first digital image data and the first identity data.

7. The method of claim 1, wherein the source of machine-readable identity data is an identity document, the method further comprising:

reading security data from the identity document; and determining that the identity document is genuine based at least in part on the security data; and wherein the generating verification data is responsive to both the determining that the identity document is genuine and the determining that the first digital image and the second digital image represent the same user.

8. The method of claim 1, wherein the associating the verification data with the document is responsive to receipt of input data indicative of an intent of the user to sign the document.

9. The method of claim 8, wherein the input data is stored and associated with the document.

10. A system for verifying that a user signing a document corresponds to a previously authenticated user, the previously authenticated user having been previously authenticated using a source of machine-readable identity data, the system comprising:

a processor;

a memory in data communication with the processor;

computer instructions stored in the memory, which, when executed by the processor, are configured to cause the system to:

receive, from the source of machine-readable identity data, first digital image data indicative of a first image of the previously authenticated user;

receive, from the source of machine-readable identity data, first identity data associated with the first digital image data, the first identity data being associated with the previously authenticated user;

receive, from a camera, a captured second image comprising second digital image data, wherein the second image corresponds to the user;

compare the first digital image data to the second digital image data;

determine, based on the comparison of the first digital image data to the second digital image data, that the first image and the second image represent the same user;

responsive to the first image and the second image being determined to represent the same user, generate verification data indicating that the user is the previously authenticated user, the verification data including second identity data indicative of the previously authenticated user;

associate the verification data with the document;

derive, based on the document, third identity data indicative of an intended signatory of the document; and determine, using the first identity data and the third identity data, that the intended signatory corresponds to the previously authenticated user; and wherein the generation of verification data is further responsive to the determining that the intended signatory corresponds to the previously authenticated user.

11. The system of claim 10, wherein the computer instructions are configured to cause the system to derive the third identity data by parsing text data of the document.

12. The system of claim 10, wherein the source of machine-readable identity data is an identity document, the identity document having previously authenticated the previously authenticated user; wherein the computer instructions are further configured to cause the system to:

capture, using a camera, an image of the identity document, thereby to receive at least one of the first digital image data and the first identity data.

13. The system of claim 12, wherein the computer instructions are configured to cause the system to capture an image of the identity document thereby to obtain the first digital image data, and wherein the computer instructions are further configured to cause the system to:

access, by a chip reader, an integrated circuit component of the identity document, thereby to obtain third digital image data indicative of a third digital image of the previously authenticated user;

compare the second digital image data to the third digital image data; and determine, based on the comparison of the second digital image data to the third digital image data, that the second digital image and the third digital image represent the same user.

14. The system of claim 10, wherein the source of machine-readable identity data is an identity document and the computer instructions are further configured to cause the system to:

access, by a chip reader, an integrated circuit component of the identity document thereby to receive the first digital image data and the first identity data.

15. The system of claim 10, wherein the source of machine-readable identity data is an identity document and the computer instructions are further configured to cause the system to:

read security data from the identity document; and determine that the identity document is genuine based at least in part on the security data; and wherein the generation of verification data is responsive to both the determining that the identity document is genuine and the determining that the first digital image and the second digital image represent the same user.

16. The system of claim 10, wherein the computer instructions are configured to cause the system to associate the verification data with the document responsive to receipt of input data indicative of an intent of the user to sign the document.

17. The system of claim 16, wherein the computer instructions are configured to further cause the system to store the input data and associate the stored input data with the document.

* * * * *